US007260716B1

(12) United States Patent
Srivastava

(10) Patent No.: US 7,260,716 B1
(45) Date of Patent: Aug. 21, 2007

(54) METHOD FOR OVERCOMING THE SINGLE POINT OF FAILURE OF THE CENTRAL GROUP CONTROLLER IN A BINARY TREE GROUP KEY EXCHANGE APPROACH

(75) Inventor: Sunil K. Srivastava, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/408,420

(22) Filed: Sep. 29, 1999

(51) Int. Cl.
*H04L 29/00* (2006.01)
*H04L 29/06* (2006.01)
*H04L 9/12* (2006.01)
*H04L 9/14* (2006.01)

(52) U.S. Cl. .................. 713/163; 713/162; 713/150; 713/168; 713/171; 380/277; 380/264; 380/283

(58) Field of Classification Search ................ 713/163; 709/221
See application file for complete search history.

(56) References Cited

U.S. PATENT DOCUMENTS

| 4,200,770 | A | | 4/1980 | Hellman et al. |
| 4,531,020 | A | | 7/1985 | Wechselberger et al. |
| 4,578,531 | A | | 3/1986 | Everhart et al. |
| 4,776,011 | A | | 10/1988 | Busby |
| 4,881,263 | A | | 11/1989 | Herbison et al. |
| 5,309,516 | A | | 5/1994 | Takaragi et al. |
| 5,351,295 | A | | 9/1994 | Perlman et al. |
| 5,361,256 | A | * | 11/1994 | Doeringer et al. .......... 370/390 |
| 5,588,060 | A | | 12/1996 | Aziz |
| 5,588,061 | A | | 12/1996 | Ganesan et al. |

(Continued)

FOREIGN PATENT DOCUMENTS

EP    0 952 718 A2    10/1999

(Continued)

OTHER PUBLICATIONS

Alfred J. Menezes, "Handbook of Applied Cryptography," 1997, CRC Press LLC., pp. 519-520.

(Continued)

*Primary Examiner*—Syed A. Zia
(74) *Attorney, Agent, or Firm*—Hickman Palermo Truong & Becker LLP

(57) ABSTRACT

An approach for managing addition or deletion of nodes in a multicast or broadcast group, which avoids introducing a single point of failure at a group controller, certificate authority, or key distribution center, is disclosed. A central group controller utilizes a binary tree structure to generate and distribute session keys for the establishment of a secure multicast group among multiple user nodes. The central group controller is replicated in a plurality of other group controllers, interconnected in a network having a secure communication channel and connected to a load balancer. The secure communication channel is established using a public key exchange protocol. The load balancer distributes incoming join/leave requests to a master group controller. The master group controller processes the join or leave, generates a new group session key, and distributes the new group session key to all other group controller replicas. Each group controller is successively designated as master group controller in real time when a former master group controller crashes or relinquishes its master authority.

80 Claims, 19 Drawing Sheets

U.S. PATENT DOCUMENTS

| | | | |
|---|---|---|---|
| 5,600,642 A * | 2/1997 | Pauwels et al. | 370/396 |
| 5,630,184 A * | 5/1997 | Roper et al. | 709/221 |
| 5,633,933 A | 5/1997 | Aziz | |
| 5,663,896 A | 9/1997 | Aucsmith | |
| 5,724,425 A | 3/1998 | Chang et al. | |
| 5,748,736 A * | 5/1998 | Mittra | 713/163 |
| 5,761,305 A | 6/1998 | Vanstone et al. | |
| 5,805,578 A * | 9/1998 | Stirpe et al. | 370/255 |
| 5,832,229 A | 11/1998 | Tomoda et al. | |
| 5,841,864 A | 11/1998 | Klayman et al. | |
| 5,850,451 A | 12/1998 | Sudia | |
| 5,889,865 A | 3/1999 | Vanstone et al. | |
| 5,920,630 A | 7/1999 | Wertheimer et al. | |
| 5,987,131 A | 11/1999 | Clapp | |
| 6,009,274 A | 12/1999 | Fletcher et al. | |
| 6,049,878 A | 4/2000 | Caronni et al. | |
| 6,055,575 A | 4/2000 | Paulsen et al. | |
| 6,088,336 A * | 7/2000 | Tosey | 370/255 |
| 6,119,228 A | 9/2000 | Angelo et al. | |
| 6,151,395 A | 11/2000 | Harkins | |
| 6,216,231 B1 | 4/2001 | Stubblebine | |
| 6,226,383 B1 | 5/2001 | Jablon | |
| 6,240,188 B1 | 5/2001 | Dondeti et al. | |
| 6,240,513 B1 | 5/2001 | Friedman et al. | |
| 6,247,014 B1 | 6/2001 | Ladwig et al. | |
| 6,256,733 B1 | 7/2001 | Thakkar et al. | |
| 6,263,435 B1 | 7/2001 | Dondeti et al. | |
| 6,272,135 B1 * | 8/2001 | Nakatsugawa | 370/390 |
| 6,279,112 B1 | 8/2001 | O'Toole et al. | |
| 6,295,361 B1 | 9/2001 | Kadansky et al. | |
| 6,330,671 B1 | 12/2001 | Aziz | |
| 6,332,163 B1 | 12/2001 | Bowman-Amuah | |
| 6,363,154 B1 | 3/2002 | Peyravian et al. | |
| 6,434,612 B1 * | 8/2002 | Hughes et al. | 709/223 |
| 6,483,921 B1 | 11/2002 | Harkins | |
| 6,507,562 B1 * | 1/2003 | Kadansky et al. | 370/216 |
| 6,570,847 B1 | 5/2003 | Hosein | |
| 6,584,566 B1 | 6/2003 | Hardjono | |
| 6,633,579 B1 * | 10/2003 | Tedijanto et al. | 370/432 |
| 6,636,968 B1 | 10/2003 | Rosner et al. | |
| 6,643,773 B1 | 11/2003 | Hardjono | |
| 6,684,331 B1 | 1/2004 | Srivastava | |
| 6,745,243 B2 * | 6/2004 | Squire et al. | 709/227 |
| 2005/0129236 A1 * | 6/2005 | Sharma | 380/259 |
| 2006/0168446 A1 * | 7/2006 | Ahonen et al. | 713/163 |

FOREIGN PATENT DOCUMENTS

| | | |
|---|---|---|
| EP | 0 994 600 A2 | 4/2000 |

OTHER PUBLICATIONS

Bruce Schneier, "Applied Cryptography," 1996, John Wiley & Sons, Inc., pp. 33-35 and 47-65.

Robert Orfali et al., "The Essential Distributed Objects Survival Guide," 1996, pp. 448-449.

David Chappell, "Understanding Microsoft Windows 2000 Distributed Services," 2000, pp. 319-324.

Robert Orfali et al., "Client/Server Survival Guide Third Edition," 1999, p. 488.

Koblitz, Neal, A Course in Number Theory and Cryptography, 1994, Springer Verlag New York Inc. 2nd Edition, 8 pages.

Harry Newton, Newton's Telecom Dictionary, 1998, Telecom Books, 14th Edition, p. 228.

IEEE Transactions On Information Theory, vol. IT-22, No. 6 (Nov. 1976) entitled "New Directions in Cryptography" by Whitfield Diffie and Martin E. Hellman.

Proceedings of the IEEE, vol. 76, No. 5 (May 1988) entitled "The First Ten Years of Public-Key Cryptography" by Whitfield Diffie.

MIT/LCS/TM-537, Laboratory for Computer Science (Aug. 1995) entitled "Guaranteed Partial Key-Escrow", Handout #13, by Silvio Micali.

Proceedings of the Fourth Annual Conference on Computer and Communications Security, ACM, 1997 (Nov. 1996) entitled "Verifiable Partial Key Escrow" by Mihir Bellare and Shafi Goldwasser.

Federal Information Processing Standards Publication 185 (Feb. 9, 1994) entitled "U.S. Department of Commernce/National Institute of Standards and Technology", Escrowed Encryption Standard, Category: Telecommunications Security.

Cylink Corporation Resources entitled "Alternatives to RSA: Using Diffie-Hellman with DSS".

* cited by examiner

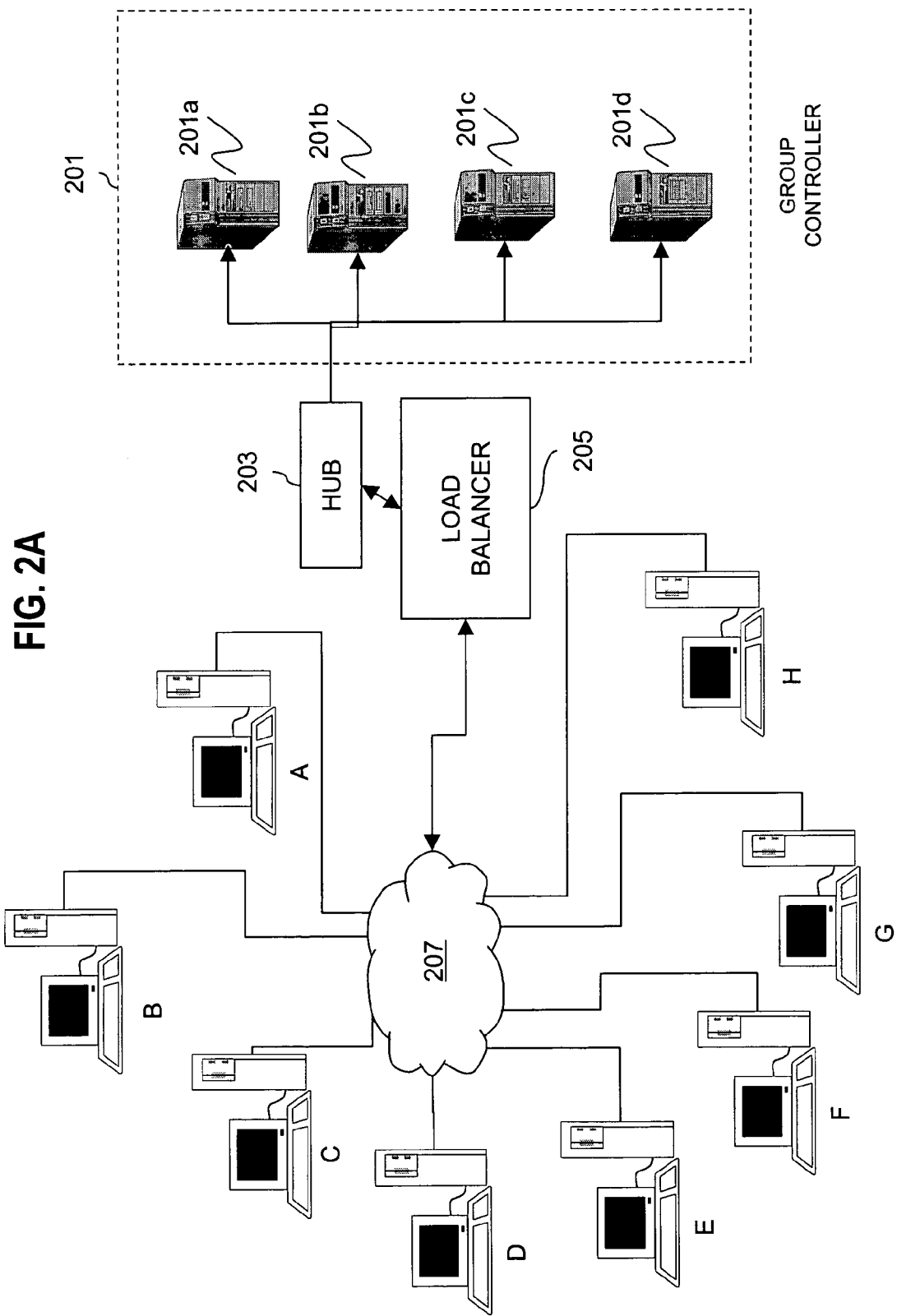

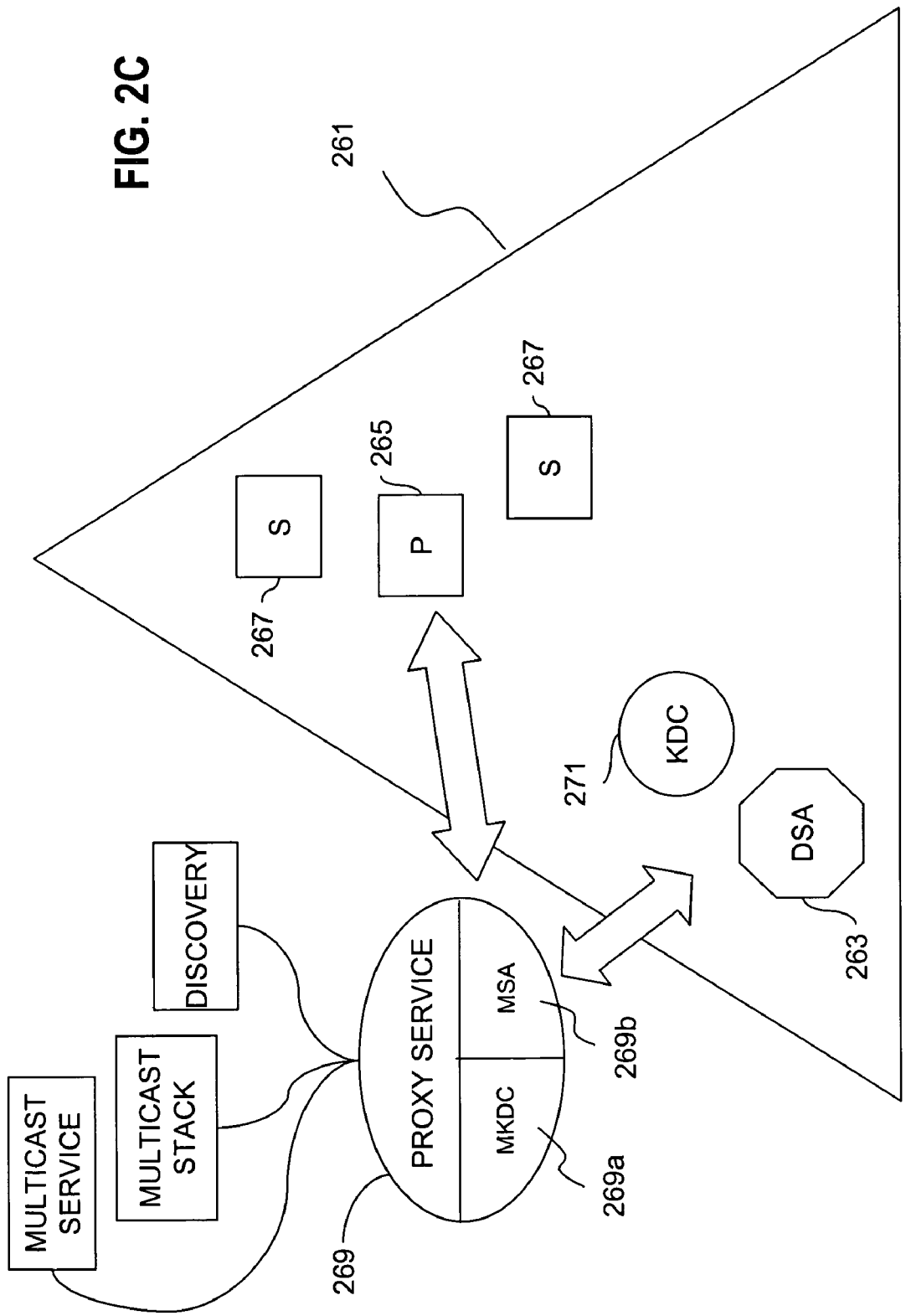

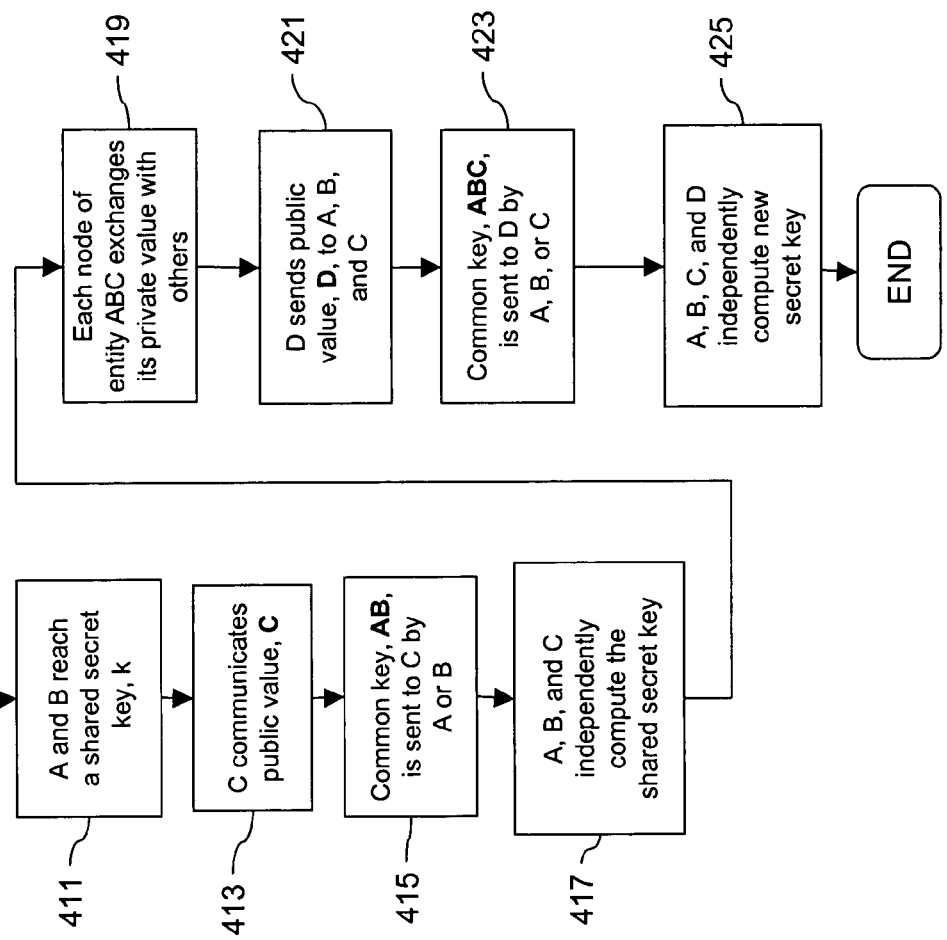

METHOD FOR OVERCOMING THE SINGLE POINT OF FAILURE OF THE CENTRAL GROUP CONTROLLER IN A BINARY TREE GROUP KEY EXCHANGE APPROACH

FIELD OF THE INVENTION

The invention generally relates to secure network communication systems. The invention relates more specifically, to a method and apparatus for session key distribution that provides secure communication among broadcast or multicast groups of nodes that are organized in a binary tree structure based on a directory, using a group controller, without a single point of failure.

BACKGROUND OF THE INVENTION

The proliferation of network computing has shaped how society conducts business and personal communication. As reliance on computer networks grows, the flow of information between computers continues to increase in dramatic fashion. Accompanying this increased flow of information is a proportionate concern for network security. Commercial users, who regularly conduct business involving the exchange of confidential or company proprietary information over their computer networks, demand that such information is secure against interception by an unauthorized party or to intentional corruption. In addition, with the acceptance of electronic commerce over the global Internet, all users recognize the critical role cryptographic systems play in maintaining the integrity of network communication.

Cryptography is the art and science of keeping messages secure. A message is information or data that is arranged or formatted in a particular way. In general, a message, sometimes referred to as "plaintext" or "cleartext," is encrypted or transformed using a cipher to create "ciphertext," which disguises the message in such a way as to hide its substance. In the context of cryptography, a cipher is a mathematical function that can be computed by a data processor. Once received by the intended recipient, the ciphertext is decrypted to convert the ciphertext back into plaintext. Ideally, ciphertext sufficiently disguises a message in such a way that even if the ciphertext is obtained by an unintended recipient, the substance of the message cannot be discerned from the ciphertext.

Many different encryption/decryption approaches for protecting information exist. In general, the selection of an encryption/decryption scheme depends upon considerations such as the types of communications to be made more secure, the particular parameters of the network environment in which the security is to be implemented, and desired level of security. An important consideration is the particular system on which a security scheme is to be implemented since the level of security often has a direct effect on system resources.

For example, for small applications that require a relatively low level of security, a traditional restricted algorithm approach may be appropriate. With a restricted algorithm approach, a group of participants agree to use a specific, predetermined algorithm to encrypt and decrypt messages exchanged among the participants. Because the algorithm is maintained in secret, a relatively simple algorithm may be used. However, in the event that the secrecy of the algorithm is compromised, the algorithm must be changed to preserve secure communication among the participants. Scalability, under this approach, is an issue. As the number of participants increases, keeping the algorithm secret and updating it when compromises occur place an undue strain on network resources. In addition, standard algorithms cannot be used since each group of participants must have a unique algorithm.

To address the shortcomings of traditional restricted algorithm approaches, many contemporary cryptography approaches use a key-based algorithm. Generally two types of key-based algorithms exist: symmetric algorithms; and asymmetric algorithms, of which one example is a public key algorithm. As a practical matter, a key forms one of the inputs to a mathematical function that is used by a processor or computer to generate a ciphertext.

Public key algorithms are designed so that the key used for encryption is different than the key used for decryption. These algorithms are premised on the fact that the decryption key cannot be determined from the encryption key, at least not in any reasonable amount of time with practical computing resources. Typically, the encryption key (public key) is made public so that anyone, including an eavesdropper, can use the public key to encrypt a message. However, only a specific participant in possession of the decryption key (private key) can decrypt the message.

Public key algorithms, however, often are not employed as a mechanism to encrypt messages, largely because such algorithms consume an inordinate amount of system resources and time to encrypt entire messages. Further, public key encryption systems are vulnerable to chosen-plaintext attacks, particularly when there are relatively few possible encrypted messages.

As a result, a public key cryptosystem generally is utilized to establish a secure data communication channel through key exchanges among the participants. Two or more parties, who wish to communicate over a secure channel, exchange or make available to each other public (or non-secure) key values. Each party uses the other party's public key value to privately and securely compute a private key, using an agreed-upon algorithm. The parties then use their derived private keys in a separate encryption algorithm to encrypt messages passed over the data communication channel. Conventionally, these private keys are valid only on a per communication session basis, and thus, are referred to as session keys. These session keys can be used to encrypt/decrypt a specified number of messages or for a specified period of time.

A typical scenario involves participants A and B, in which user A is considered a publisher of a message to a subscriber, user B. The public key algorithm used to establish a secure channel between publisher, A, and subscriber, B, is as follows:

1. B provides a public key, $B$, to A.
2. A generates a random session key SK, encrypts it using public key $B$ and sends it to B.
3. B decrypts the message using private key, b (to recover the session key SK).
4. Both A and B use the session key SK to encrypt their communications with each other; after the communication session, A and B discard SK.

The above approach provides the added security of destroying the session key at the end of a session, thereby, providing greater protection against eavesdroppers.

Once a multicast group is established, management of the sessions keys due to membership changes poses a number of problems. Forward secrecy, which arises when a member node leaves the multicast group and may still possess the capability to decipher future messages exchanged among the group, becomes a concern. In addition, in the case where a new member node enters the multicast group, the new member should not be permitted to decrypt the past messages of the multicast group. Another consideration involves making session key updates when a "join" or "leave" occurs; updates must be rapid to prevent undue system delay. This issue relates to how well the network scales to accommodate additional users.

Another conventional technique used to establish secure communication employs a trusted third party authentication mechanism, such as a certificate authority ("CA") or key distribution center ("KDC") to regulate the exchange of keys. FIG. 9 is a block diagram of a system that uses a single central group controller (GC) 901 that has responsibility for distributing, creating, and updating session keys to members of the multicast group (users A-H). The eight users, A-H, communicate with group controller 901 via separate point-to-point connections 903 to obtain a dynamic group session key. The channels 903 can be made secure by using a standard Diffie-Hellman key exchange protocol.

The group controller preferably comes to a shared Group Session key using a binary tree approach. The KDC or CA carries out a third party authentication. The keys can be sent in a multicast or broadcast messages or overlapping broadcast or multicast messages or many point to point messages. Diffie-Hellman is not required to secure communications with the group controller; the binary tree approach provides it. Ideally, only one message from the group controller is needed.

Alternatively, Diffie-Hellman is used to do a point to point communication with the CA or KDC, and the CA or KDC can give out a group session key without using the binary tree approach. All nodes get the same session key using N−1 point to point messages. These two approaches are orthogonal and can be combined for optimization.

To set up the secured channel among the nodes, N−1 messages are exchanged, wherein N is the number of nodes. Although this is relatively low overhead in terms of messages exchanged, a major drawback is that the centralized group controller 901 represents a single point of failure, and therefore the system lacks fault tolerance. If the group controller 901 is down, no secure communication can exist among the multicast group of users A-H. Such a prospect is unacceptable, especially in mission critical systems.

Another drawback is that the group controller 901 is a potential bottleneck in the network when a binary tree algorithm is used, and the KDC or CA are potential bottlenecks when other mechanisms are used. For instance, if multiple nodes request to join the multicast group, the controller 901 may not be able to process all such requests in a timely manner. This problem may be acute if the multicast group is over a wide area network (WAN). Further, a system dependent upon a group controller 901 is not easily enlarged or scaled, due, in part, to physical hardware constraints.

A binary tree approach is disclosed in co-pending application Ser. No. 09/407,785, entitled "METHOD AND APPARATUS FOR CREATING A SECURE COMMUNICATION CHANNEL AMONG MULTIPLE EVENT SERVICE NODES," filed concurrently herewith, and naming as inventors Sunil K. Srivastava, Jonathan Trostle, Raymond Bell, and Ramprasad Golla, the entire disclosure of which is hereby incorporated by reference as if fully set forth herein. The binary tree approach described therein makes it possible to scale a secure communication system to large multicast groups, with less overhead involved in transmission of new group session keys when members join in a multicast group. Advantageously, each affected member does only $\log_2 N$ decryption operations; further, when a member joins or leaves, the central group controller, which acts as a group membership coordinator, sends only a subset of keys to existing group members on an affected tree branch. All keys that are affected can be sent, ideally, in one multicast or broadcast message, and only keys that correspond to a particular node will be decrypted by that node.

One issue with this approach, however, is that the central group controller presents a single point of failure. The KDC and CA also present a single point of failure in approaches that do not use a binary tree mechanism.

Based upon the foregoing, there is a clear need for improved approaches to key exchange that eliminate a single point of failure, especially among broadcast or multicast group members.

There is also a need for an approach for providing a secure communication channel among a group controller, KDC, or CA so that the group controller, KDC or CA may be distributed. Since the group controller, KDC, and CA normally are essential for establishing any secure channel, this need presents a circular or "chicken and egg" type of paradox.

In particular, there is an acute need for an improved approach to enhance scalability and fault tolerance, particularly over a WAN.

Based on the need to provide secure communication while limiting the adverse effects on system resources and the limitations in the prior approaches, an approach for providing secure communication that provides a relatively high level of security while requiring relatively fewer system resources and time to perform is highly desirable.

SUMMARY OF THE INVENTION

According to one aspect, a method is provided for creating a secure multicast or broadcast group. The method involves managing addition and deletion of network nodes from and to a secure multicast or broadcast group of nodes in a communications network without a single point of failure, wherein each of the nodes is associated with one of a plurality of replicated group controllers and wherein the nodes and the group controllers are logically organized in a binary tree that represents the network nodes and the group controllers, in which leaf nodes of the binary tree represent network nodes that are joining or leaving the group, intermediate nodes represent other network nodes, and root nodes represent the group controllers. In an embodiment, the method comprises the steps of joining one of the group controllers to the plurality of replicated group controllers in a local network; establishing, by one of the group controllers, a secure communication channel between one of the group controllers and another of the group controllers using a key exchange protocol; receiving a request to add or delete a node of the group from a load balancer that is coupled to the plurality of group controllers; creating and storing a new group session key for each node in each branch of the tree that is affected by adding or deleting the node from the group; and distributing a group session key from one of the group controllers to the network nodes.

Using this arrangement, the concern that the central group controller is a single point of failure is alleviated.

According to another aspect, a communication system for creating a secure multicast or broadcast group comprises a plurality of group controllers that are configured for establishing secure communication channels among the group controllers, using a public key exchange protocol, a broadcast version of a public key protocol, or another approach. A load balancer is coupled to the plurality of group controllers and is configured for load balancing traffic destined for the group controllers. In addition, a plurality of nodes communicates with the load balancer, whereby the plurality of nodes generates the traffic that is load balanced. One of the group controllers is configured for distributing a group session key based upon a logical arrangement of the nodes in a binary tree structure. The binary tree structure has a root node, intermediate nodes, and leaf nodes; such that the plurality of nodes correspond to leaf nodes of the binary tree structure and the group controllers correspond to the root node. Such an arrangement provides a fault tolerant group controller for distributing group session keys.

In yet another aspect, a computer system for establishing a secure multicast or broadcast group among a plurality of nodes comprises a communication interface that receives a token, in the form of a message from other group controllers, and interfaces the plurality of nodes via an external load balancer device. The load balancer selectively routes traffic from the plurality of nodes to the computer system based on load. A bus is coupled to the communication interface for transferring data. One or more processors are coupled to the bus for selectively generating a group session key in response to receipt of the token. A memory is coupled to the one or more processors via the bus. The memory includes one or more sequences of instructions which when executed by the one or more processors cause the one or more processors to perform the step of executing a public key exchange protocol to establish a secure communication channel between the computer system and an external computer system that has similar functionality as the computer system via the communication interface. The memory stores a logical arrangement of a plurality of nodes in a binary tree structure that has a root node, intermediate nodes, and leaf nodes. The plurality of nodes corresponds to leaf nodes of the binary tree structure, and the computer system corresponds to the root node. The above computer system provides a fault tolerant group controller that is readily scalable.

BRIEF DESCRIPTION OF THE DRAWINGS

Embodiments are illustrated by way of example, and not by way of limitation, in the figures of the accompanying drawings in which like reference numerals refer to similar elements and in which:

FIG. 2A, FIG. 2B, and FIG. 2C are block diagrams of a secure network utilizing a group controller.

FIG. 4A, FIG. 4B, FIG. 4C, and FIG. 4D are diagrams illustrating methods for key exchange.

DETAILED DESCRIPTION OF THE PREFERRED EMBODIMENT

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

An approach for creating a secured multicast or broadcast group in a communications network uses a distributed system to disseminate and update group session keys. To establish a secured channel among the participating multicast group members, a group controller approach is used. However, functionality of the group controller is distributed across multiple entities, which themselves communicate over a secure channel. The entities, which make up the group controller, use various key exchange algorithms to securely communicate. The key exchange protocols generate session keys based on a public key scheme, without needing to rely on a group controller approach. Further, the approach exploits the commonality between the physical topology of directory based domains (as well as multicast routing trees) and the structure of a binary tree to generate a network of group controllers that efficiently manages membership within a secure multicast or broadcast group.

In a basic public key encryption approach, a group of participants publish their public keys, for example, in a database, and maintain their own private keys. These participants can access the database to retrieve the public key of the participant to whom they want to send a message and use it to encrypt a message destined for that participant. Unfortunately, the database, even if secure, is vulnerable to key substitution during transmission of the keys.

This problem is alleviated by using a trusted intermediary, called a Central Authority (CA), Key Distribution Center (KDC) or Group Controller (GC), which has the responsibility of distributing the stored public keys to the multicast or broadcast group members. The KDC accomplishes this task by encrypting the public keys with its private key, which is shared with each of the group members. The group members then decipher the encrypted message to determine each others' public keys. In addition to publishing public keys by which session keys may be derived by the group members, the KDC may distribute actual session keys.

Figure 1:
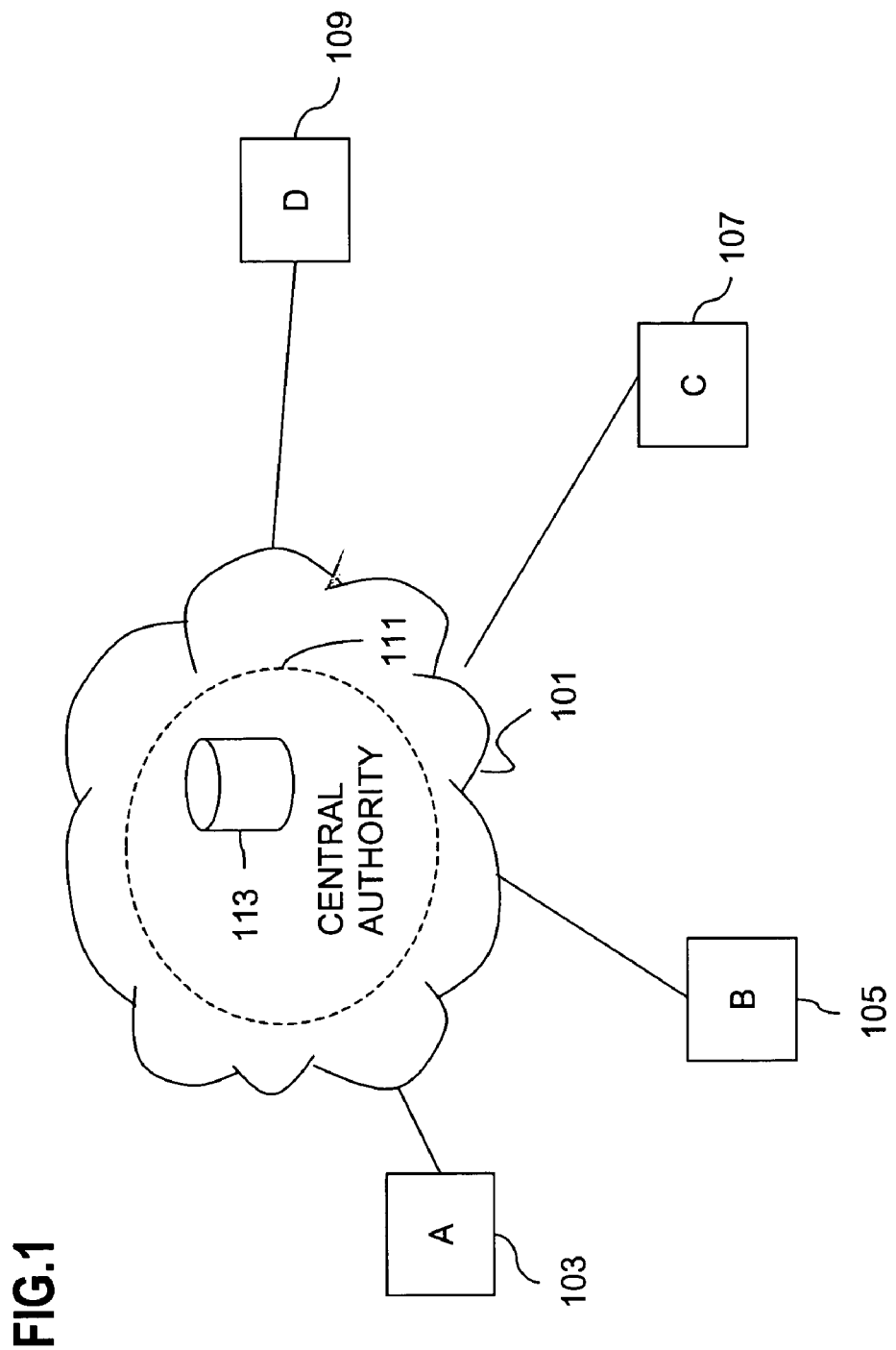
FIG. 1 is a block diagram of a secure communication system employing a key distribution center (KDC).

FIG. 1 shows an exemplary implementation with four users A, B, C, D connected via network 101. The network 101 may be a packet switched network, which supports the Internet Protocol (IP). A Central Authority 111, which is a third party trusted authentication authority, is hosted in network 101. In a preferred embodiment, Central Authority 111 is a distributed multicast subnetwork made up of multiple KDCs, CAs, or GCs that are interconnected over secured channels in a hierarchical relationship. Among other functions, the Central Authority 111 provides authentication and validation services when individual nodes join the multicast or broadcast group. Although four (4) users A, B, C, D are shown as an example, any number of users or nodes can be used.

Central Authority 111 may be a KDC subnetwork in an environment that uses an exchange of Kerberos credentials for communications security. However, any other suitable central authority mechanism may be substituted. For example, a certificate authority (CA) may be used as Central Authority 111 when a public key infrastructure (PKI) is used for communications security in the network.

Central Authority 111 establishes point-to-point communication with the workstations 103, 105, 107, 109 to authenticate them. Workstations 103, 105, 107, 109 obtain dynamic session keys from the Central Authority 111 for subsequent secure communication among themselves. In this case, Central Authority 111 generates the session key. Alternatively, one of the nodes 103, 105, 107, 109, which initiates communication with the multicast group, may generate and supply a dynamic group key based on a symmetrical cryptographic algorithm to the Central Authority 111. Thereafter, other nodes seeking to participate in the secure communication may do so by requesting this group session key from the Central Authority 111, distributes it using secured point-to-point communication.

For purposes of illustration, assume that user A desires to publish a message to the other users B, C, D. As a publisher, user A encrypts the message with the dynamic group session key and signs a message digest with its private key. The message digest can include a time-stamp and serial numbers for authentication purposes. If user A is trusted by the other users B, C, D, user A itself can assume the role of a KDC.

If each of the members of the multicast group (e.g., A, B, C, D) can be either a publisher or a subscriber, then each individual group member can employ the group session key when it publishes a message. Subscribers are required to know the group session key to decrypt the message. Normally the group session key is not used as a signature because it could be used to spoof a publisher and send an unauthorized message. Accordingly, third party authentication is used and message signatures are constructed from a publisher's private key, message digest and time stamp.

In an exemplary embodiment, the group members initially authenticate themselves by using a certificate authority (CA) or a Kerberos KDC, in which case the session keys need not serve as authentication signatures or certificates. Kerberos is a known key based authentication service. The directory can provide Kerberos service on a number of operating systems (e.g., Windows, UNIX, etc.). A CA may be used with the Secure Sockets Layer Service Provider Interface (SSL-SPI) and SSL, TLS or Kerberos providers may be used with the Generic Security Service Application Programming Interface (GSS-API).

Central Authority 111, like the GC or KDC, in a preferred embodiment, is a distributed Multicast KDC (MKDC), whereby a designated or root MKDC tracks group membership information and conveys such information to the other MKDCs. Each of the MKDCs serves its own geographic region of users. Central Authority 111 is an interconnection of MKDCs over secured channels, which are arranged in a hierarchical relationship overlapping LDAP domains, network domains, router trees and reliable transport trees. The secure channels linking the MKDCs are established using a public key exchange protocol, such that participants in the exchange can derive a common group key without intervention from a third party, such as another group controller. Alternatively, protocols such as broadcast Diffie-Hellman can be used to establish the secure channels. MKDCs are suited to take advantage of such protocols because they are static with respect to joins and leaves from the multicast group. Thus, the frequency of a MKDC joining and leaving a group of MKDCs is relatively low. Further, MKDCs are inherently trusted systems. In Distributed Directory Service Replications, they build secure channels among themselves.

In one embodiment, the Central Authority 111 is a distributed, near-statically replicated or low latency directory, which provides the services of the KDC. In general, a directory creates active associations among users, applications, a network, and network devices. A directory is a logically centralized, highly distributed data repository that can be accessed by the applications. The distributed nature of directories is achieved by replicating data across multiple directory servers, which are strategically located throughout the network, in part, based upon traffic engineering considerations. Directories can represent network elements, services, and policies to enable ease of network administration and security. In particular, a directory can supply authentication services, whereby all users, applications, and network devices can authenticate themselves through a common scheme.

A directory server can be implemented as a distributed, replicated, object database, in which one or more master copies of the database is maintained along with a number of replicas. One type of directory is Microsoft Active Directory from Microsoft Corporation. Active Directory is a directory that uses a data storage schema as defined by the Directory-Enabled Networks (DEN) definition, and is based upon Lightweight Directory Access Protocol (LDAP). LDAP is a directory standard that is based upon the ITU (International Telecommunications Union) X.500 standard. LDAP provides client access to X.500 directory servers over a TCP/IP (Transmission Control Protocol/Internet Protocol) based network. The details of LDAP are set forth in RFC 1777 and RFC 2251, which are hereby incorporated by reference in its entirety as if fully set forth herein. X.500 employs a distributed approach storing information locally in Directory System Agents (DSAs).

In the system of FIG. 1, the directory may contain user account or security principal information for authenticating users or services along with the shared secret key between the members A, B, C, D and the directory. This information may be stored in a database 113, which can reside within each KDC or can be shared among two or more KDCs. Users A, B, C, D authenticate themselves using the security services of the directory. Further, some of the directories can serve as CAs, or work cooperatively with CAs. The secured channels within the Central Authority 111 can be established using the key exchange method discussed below with respect to FIG. 4A, FIG. 4B, FIG. 4C, FIG. 4D.

FIG. 2A shows an exemplary embodiment of a clustered central KDC, CA or GC. The clustered central KDC 201 is shown in the form of a "server farm," comprising multiple KDC servers 201a-201d. KDC servers 201a-201d communicate through a hub 203, which may be use any suitable LAN technology such as Ethernet or token ring. A load balancer 205 is linked to hub 203 to load balance the traffic from network 207, which in this example is an IP network. The load balancer 205 provides virtual server capability to represent KDC 201 as single entity to the users A-H. Thus, KDC 201 effectively has a single address, such as one IP address. The load balancer 205 can effectively direct traffic across all the KDC servers 201a-201d by mapping the one virtual IP address to the true addresses of the individual servers. With this approach, additional KDC servers can be readily added to supply security services to new users, thereby improving scalability. Normally the load balancer 205 is implemented as an IP layer router or switch.

Figure 2B:
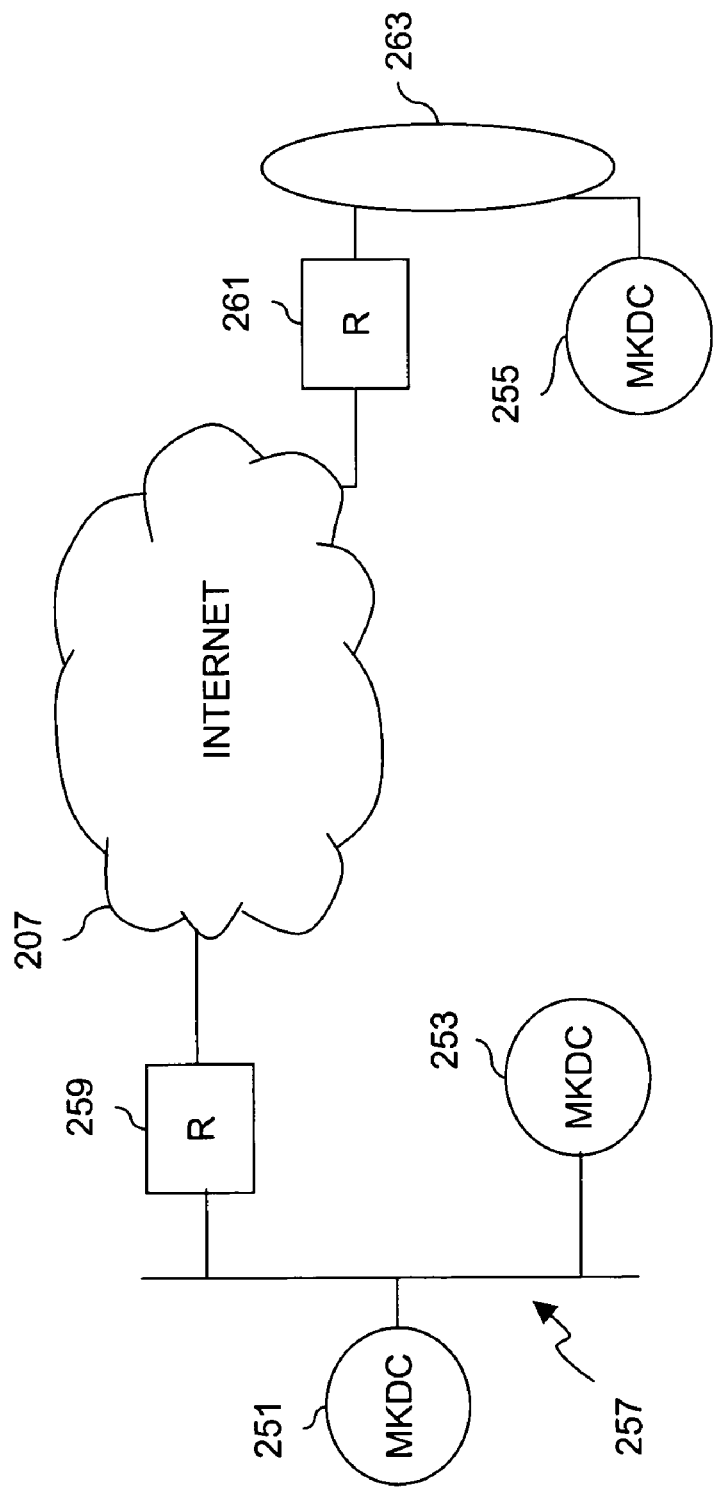

FIG. 2B shows another way to scale a system in which MKDCs 251, 253, 255 are distributed over a network at the LAN and/or WAN level. The MKDCs can be within the same or different domains. A domain is defined as a network or subnetwork that is under control by a single network management entity.

To effectively serve users, MKDCs 251, 253, 255 communicate over secure channels themselves to exchange dynamic group session keys. In this exemplary enterprise network, MKDC 251 and MKDC 253 are connected via an Ethernet LAN 257, which is further linked to a network 207, such as the global packet switched network known as the Internet, through router 259. Another MKDC 255 resides on a remote LAN 263. FIG. 2B shows LAN 263 as a token ring network, however, other types of LANs may be utilized. Secure channels can be established among MKDCs 251, 253, 255 using various key exchange protocols for multi-party communication, as discussed below in connection with FIG. 4A, FIG. 4B, FIG. 4C, FIG. 4D.

FIG. 2C shows a distributed MKDC architecture that employs directory services to create secure channels among the MKDCs. In particular, the MKDC functionality is a part of a Proxy Service 269. The Proxy Service 269 enables directory principals, such as users, applications, and network devices, to store event types in the directory. These events are queued in specific event queues, in which subscribers (also called consumers) may register to receive such events. Proxy Service 269 has three principal functions, as shown in FIG. 2C: (1) providing Multicast Service in case Multicast Service is not available to a local node, (2) providing a Reliable Multicast Stack; and (3) providing discovery of Multicast Addresses, Topic Names, Channels, or Event Types that can be published or subscribed.

Proxy Service 269 includes a multicast service agent (MSA) 269b and may be distributed across LANs and WANs, including spanning directory domains, multicast routing and transport trees in an enterprise network. Distribution may be at all levels, such as within a domain, among domains, within or among trees, etc.

As an example, FIG. 2C illustrates interaction between one MSA with various entities within one domain 261. Domain 261 has at least one directory system agent (DSA) 263 and an associated KDC 271. Also within domain 261 are a publisher 265 and two subscribers 267. DSA 263, in one implementation, is a database in which information is stored in accordance with the X.500 information model or the LDAP information model. Information is exchanged with other DSAs using the Directory System Protocol (DSP). Such information may be stored as entries to an object class, in which the actual information in an entry are called "attributes." The object class defines the types of attributes an entry may possess. Subscribers 267 can access the directory through a Directory User Agent (DUA).

Publisher 265 and subscribers 267 communicate with Proxy Service 269, including MKDC 269a and MSA 269b, to authenticate themselves, to discover what events they can publish or subscribe, respectively, and to obtain a group session key. FIG. 2C illustrates Proxy Service 269 outside domain 261, however, it may also be located within the domain. To authenticate publisher 265 and subscribers 267, MKDC 269a, a group controller, and MSA 269b utilize DSA 263, a CA and KDC 271. The publisher 265, subscribers 267, MKDC 269a, and MSA 269b are security principals with respect to DSA 263. That is, publisher 265, subscribers 267, MKDC 269a, and MSA 269b can sign into the system by supplying their credentials. The MKDC 269a creates a group session key that is specific to a publisher. As a result, when the information is replicated across the network or enterprise, local copies of the directory can be used to obtain a common group session key. It cannot support dynamic groups, however, the MKDCs are trusted nodes that do not often fail and restart; accordingly, the DSA can be used to send a group session key.

To ensure continued secured communication, changing the group session keys periodically among the MKDCs is desirable. MSA 269b, which is specific to publisher 265, generates a number of keys sufficient to enable it to cycle through numerous group session keys to prevent an unauthorized user from intercepting and using these keys. Such keys may be selected among MKDCs based on providing their date and timestamp to an algorithm that generates a key version value.

As an example, FIG. 2C shows one domain 261 that is served by Proxy Service 269. However, in a complex enterprise network, MKDCs may span thousands of domains, posing difficulty in directory replication. One approach is to have subscribers, which may reside in any number of domains different from a publisher, request group membership from the KDC in the publisher's domain. Further, in practice a directory may have or cover any number of domains. In a directory with multiple domains, each domain has a KDC and a DSA.

Control of membership joins is addressed in the system. Simultaneous requests to join require some method of arbitration to prioritize the multiple requests. One approach is to require a random wait period after a first request attempt, for example, using an exponential back-off mechanism. In the alternative, priority can be granted based upon a Time-To-Live (TTL) parameter that is conveyed in a field in an IP frame. The TTL parameter is used in the ring beacon protocol for priority determination. This protocol permits initially only neighboring nodes nearest the multicast group to join, and thereafter allows more distant nodes to become members of the multicast group. The TTL field is a numeric field in which a large value corresponds to a node that is far away from the multicast group. Effectively, the TTL field limits the radius of hops ("search ring") of the multicast packet. In the context of membership joins, preference is given to close new users before potential members who are more remote.

Under this expanding ring beacon protocol, when a new node joins the multicast group, the new node listens for a "beacon" from a neighboring node until it times out. Before timing out, if a beacon is detected, the new node is admitted to the multicast group. The beacon contains an ordinal list of members of a group, which is identified by a value that may comprise a hashed value of all the members' IP addresses. If a new node times out, it starts a group by itself, identified by a hashed value of its IP address, and expands the search ring by increasing its TTL value.

Figure 3:
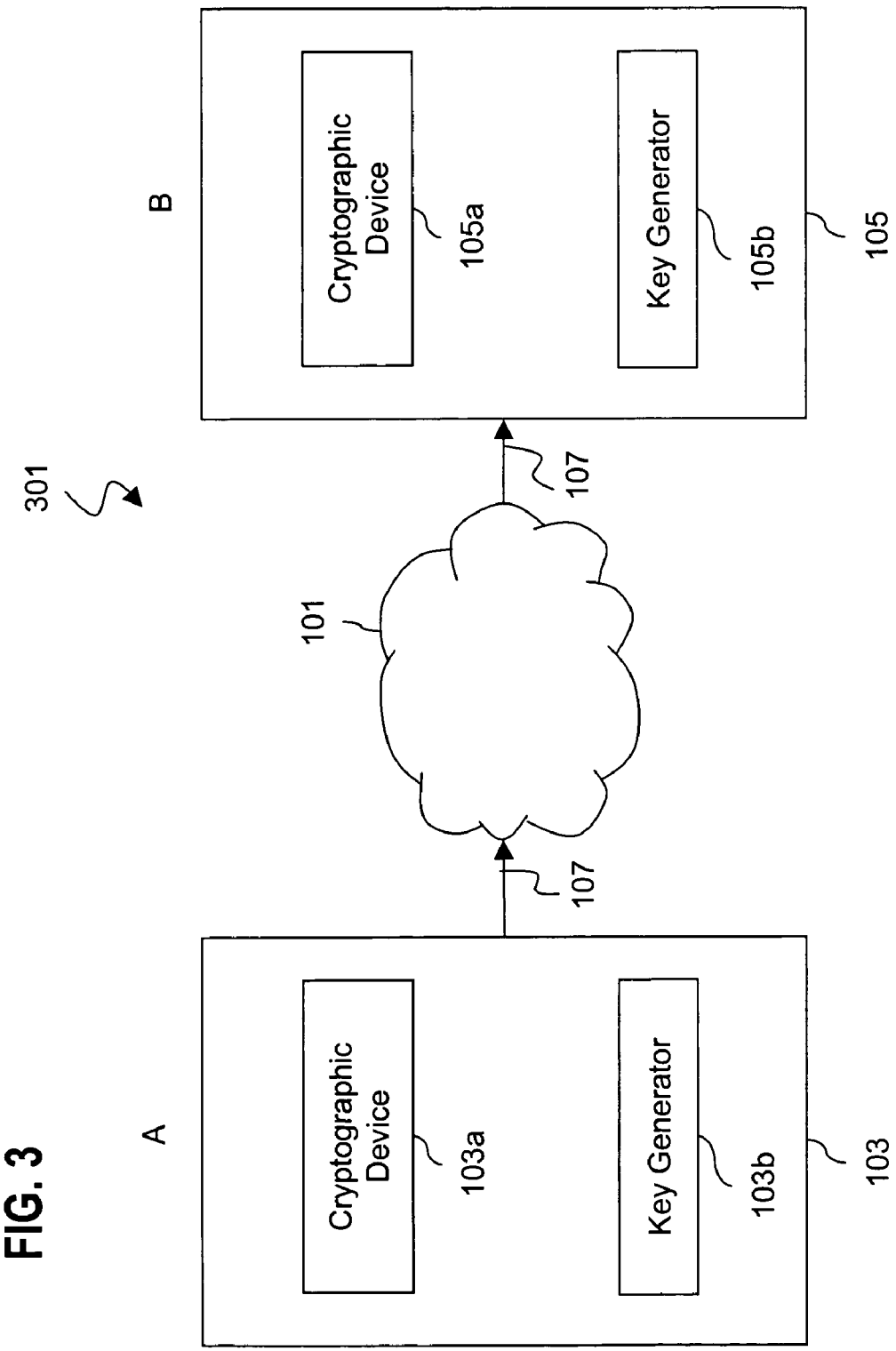
FIG. 3 is a block diagram illustrating the security mechanisms for providing secure communication between two participants in the system of FIG. 1.

FIG. 3 illustrates a secured communication system 301 that provides a secure channel between two participants. User A employing workstation 103 communicates with another workstation 105 of user B over a link 107. Link 107 is established over network 101, which includes, but is not limited to, a LAN, a WAN, the global packet-switched network known as the Internet, a wireless transmission medium, or any other medium for exchanging information between the participants. In addition, link 107 may be non-secure, thereby allowing third party access to information transmitted by the link 107, or alternatively, link 107 may be secure.

Workstations 103, 105 have components with complementary functions. Workstation 103 of user A includes a key generator 103b and a cryptographic device 103a. Key generator 103b generates public and private keys used for encrypting and decrypting information exchanged with workstation 105 of user B. Cryptographic device 103a encrypts and decrypts information exchanged with workstation 105 using private and public keys generated by key generator 103b. Similarly, workstation 105 includes a key generator 105b and a cryptographic device 105a. Key generator 105b supplies public and private keys that are used to establish a secured link 107 with workstation 103. Information exchanged with workstation 103 is encrypted and decrypted by cryptographic device 105a using private and public keys generated by key generator 105b.

Participants 103, 105 can utilize various key exchange protocols, such as the Diffie-Hellman method or the method discussed below, to exchange their keys. As a result, participants 103, 105 can securely exchange information over link 107 using a public key exchange protocol such that an eavesdropper having access to ciphertext transmitted on link 107 cannot feasibly decrypt the encrypted information.

A known public key exchange method is the Diffie-Hellman method described in U.S. Pat. No. 4,200,770. The Diffie-Hellman method relies on the difficulty associated with calculating discrete logarithms in a finite field. According to this method, two participants, A and B, each select random large numbers a and b, which are kept secret. A and B also agree publicly upon a base number p and a large prime number q, such that p is primitive mod q. A and B exchange the values of p and q over a non-secure channel or publish them in a database that both can access. Then A and B each privately computes public keys $\mathbf{A}$ and $\mathbf{B}$, respectively, as follows:

A privately computes a public key $\mathbf{A}$ as: $\mathbf{A} = p^a \bmod (q)$ (1)

B privately computes a public key $\mathbf{B}$ as: $\mathbf{B} = p^b \bmod (q)$ (2)

A and B then exchange or publish their respective public keys A and B and determine private keys $k_a$ and $k_b$ as follows:

A computes a private key $k_a$ as: $k_a = \mathbf{B}^a \bmod (q)$ (3)

B computes a private key $k_b$ as: $k_b = \mathbf{A}^b \bmod (q)$ (4)

As evident from equation (3), A's private key is a function of its own private random number, a, and the public key, $\mathbf{B}$. As it turns out, A and B arrive at the shared secret key based upon:

$$k_a = \mathbf{B}^a \bmod (q) \text{ and } k_b = \mathbf{A}^b \bmod (q)$$

Substituting for $\mathbf{A}$ and $\mathbf{B}$ using equations (1) and (2) above yields:

$$k_a = (p^b \bmod (q))^a \bmod (q) \text{ and } k_b = (p^a \bmod (q))^b \bmod (q)$$

$$k_a = p^{ba} \bmod (q) \text{ and } k_b = p^{ab} \bmod (q)$$

Therefore, $k_a = k_b$.

Using the Diffie-Hellman protocol, A and B each possesses the same secure key $k_a$, $k_b$, which can then be used to encrypt messages to each other. An eavesdropper who intercepts an encrypted message can recover it only by knowing the private values, a or b, or by solving an extremely difficult discrete logarithm to yield a or b. Thus, the Diffie-Hellman protocol provides a relatively secure approach.

Other approaches for key exchange that are suitable for use in embodiments of the present invention are disclosed in co-pending application Ser. No. 09/393,410, filed on Sep. 10, 1999, and naming as inventor Sunil K. Srivastava, and entitled "OPERATIONAL OPTIMIZATION OF A SHARED SECRET DIFFIE-HELLMAN KEY EXCHANGE AMONG BROADCAST OR MULTICAST GROUPS," the entire disclosure of which is hereby incorporated by reference as if fully set forth herein, and in co-pending application Ser. No. 09/408,420, filed on Sep. 10, 1999, and naming as inventor Sunil K. Srivastava, and entitled "PROCESSING METHOD FOR KEY EXCHANGE AMONG BROADCAST OR MULTICAST GROUPS THAT PROVIDES A MORE EFFICIENT SUBSTITUTE FOR DIFFIE-HELLMAN KEY EXCHANGE," the entire disclosure of which is hereby incorporated by reference as if fully set forth herein.

Figure 4A:
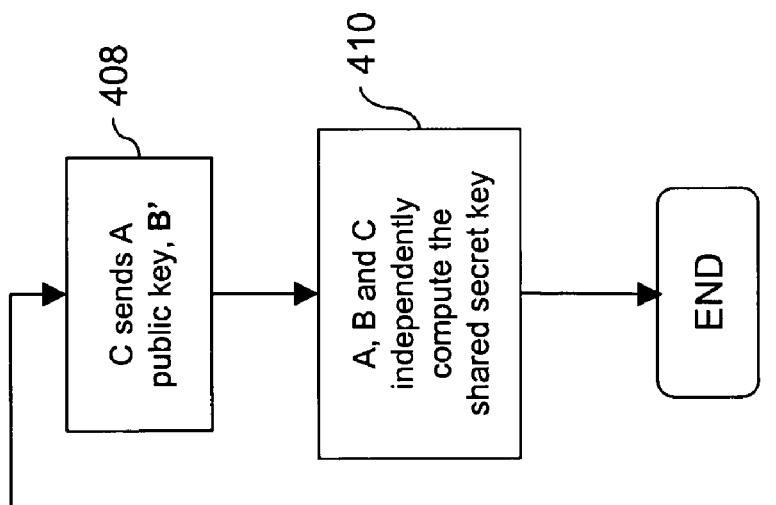
Figure 4A:
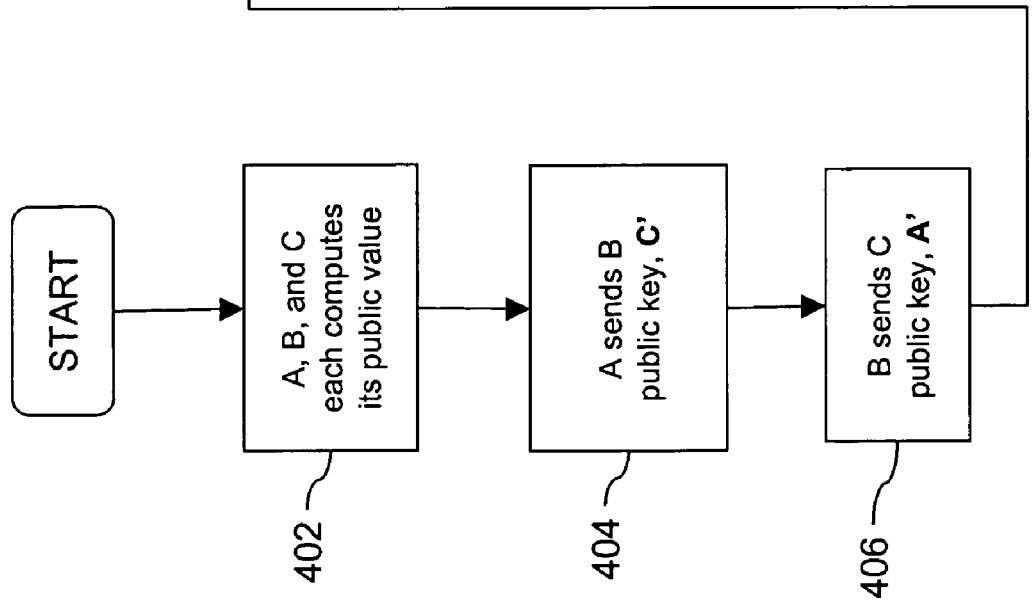

FIG. 4A shows a broadcast version of the Diffie-Hellman method involving three users A, B, C. Initially, each of the participants A, B, C randomly generates private integers, a, b, and c, respectively. Thereafter, they compute their public keys, as in step 402. These public keys are computed as follows:

$$\mathbf{A} = p^a \bmod (q) \quad (5)$$

$$\mathbf{B} = p^b \bmod (q) \quad (6)$$

$$\mathbf{C} = p^c \bmod (q) \quad (7).$$

Next, in step 404, user A sends message $\mathbf{C}' = \mathbf{C}^a \bmod (q)$ to user B. In turn, B transmits the message, $\mathbf{A}' = \mathbf{A}^b \bmod (q)$ to C, as shown by step 406.

In step 408, user C sends A the message $\mathbf{B}' = \mathbf{B}^c \bmod (q)$. As shown in step 410, the users are then able to arrive at a shared secret key, k, by computing:

$$A \text{ computes } k: k = \mathbf{B}'^a \bmod (q) = p^{abc} \bmod (q) \quad (8)$$

$$B \text{ computes } k: k = \mathbf{C}'^b \bmod (q) = p^{abc} \bmod (q) \quad (9)$$

$$C \text{ computes } k: k = \mathbf{A}'^c \bmod (q) = p^{abc} \bmod (q) \quad (10)$$

The method establishes a secure communication channel among users A, B, and C. Although three users are discussed in the above example, the Diffie-Hellman key-exchange method applies to any number of users.

Figure 4B:
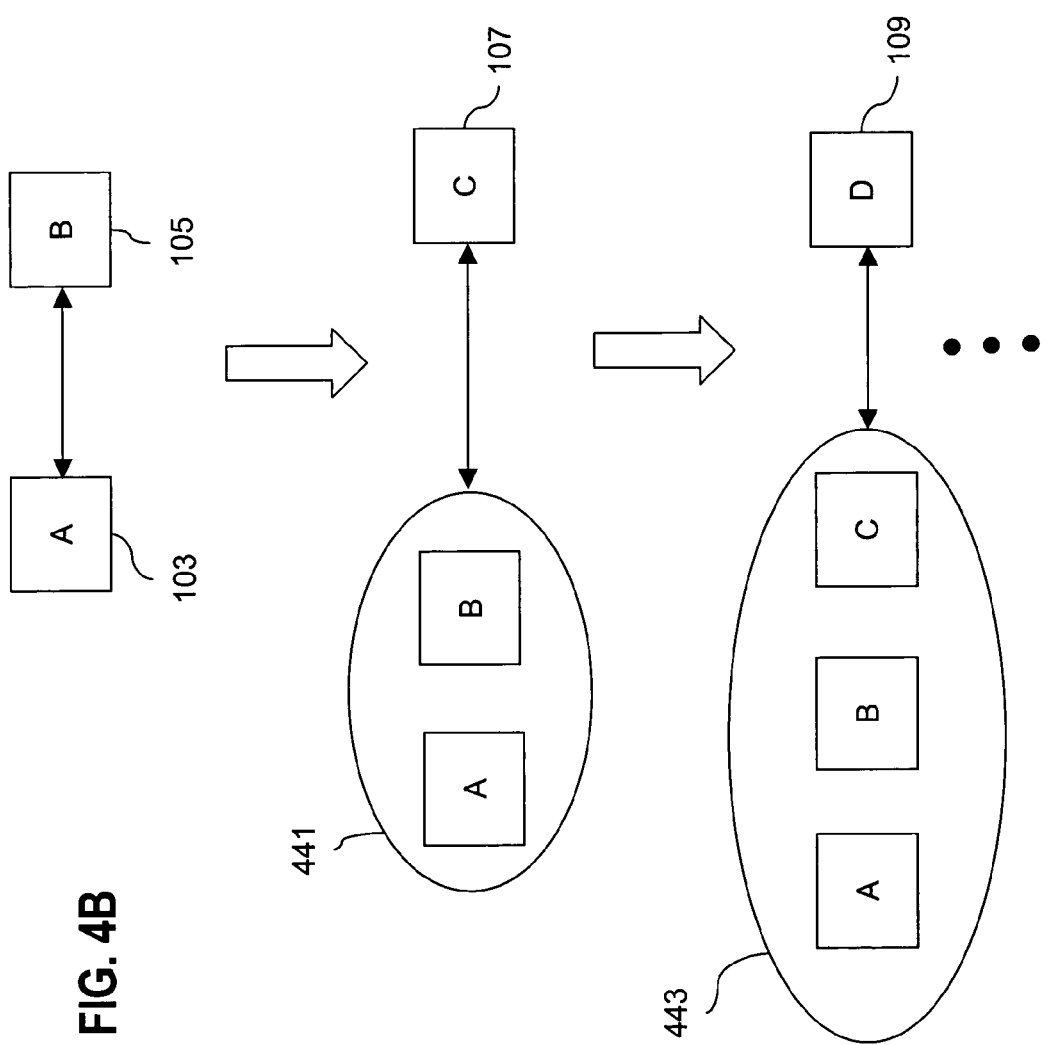

FIG. 4B shows another public key exchange protocol that is based mathematically on the Diffie-Hellman method and that addresses multicast group membership two entities at a time. An entity may comprise one or more nodes. In this example, a multicast group comprises users A, B, C, D of the network of FIG. 1. Initially, assume that users A, B use workstations 103, 105 to establish a common shared key to securely communicate between themselves. Conceptually, users A, B form a single entity 441 and a subsequent user or node seeking to join the multicast group effectively views the previously formed multicast group as a single unit. Hence, users A, B are treated as one entity with respect to arriving at a new shared secret key with a new group member. Only one user, A or B, needs to communicate with the new multicast group member, user C. In the preferred embodiment, the user who last joins the multicast group is designated as the node that relays the group's information to the new user.

The current multicast group or entity 441 has two users A, B. B is the designated node, because B can be considered as having joined with A. Alternatively, the designated node can be determined according to physical proximity to the new node, or other metrics such as telecommunication cost, reliability, link utilization, etc. Once entity 441 and user C arrive at a new shared secret key, they form a new entity 443, constituting a new multicast group that subsumes multicast group 441.

If user D wishes to join the multicast group, only one of the users among A, B, C needs to share the group's public value with user D. Because user C was the last member to join, it forwards the group's public value to user D, who may then compute the shared secret key. The foregoing binary approach of determining a shared secret key between two entities at a time, as further described with respect to FIG. 4C and FIG. 4D, results in a greatly reduced number of messages exchanged among the group members over the standard broadcast Diffie-Hellman approach.

Figure 4C:
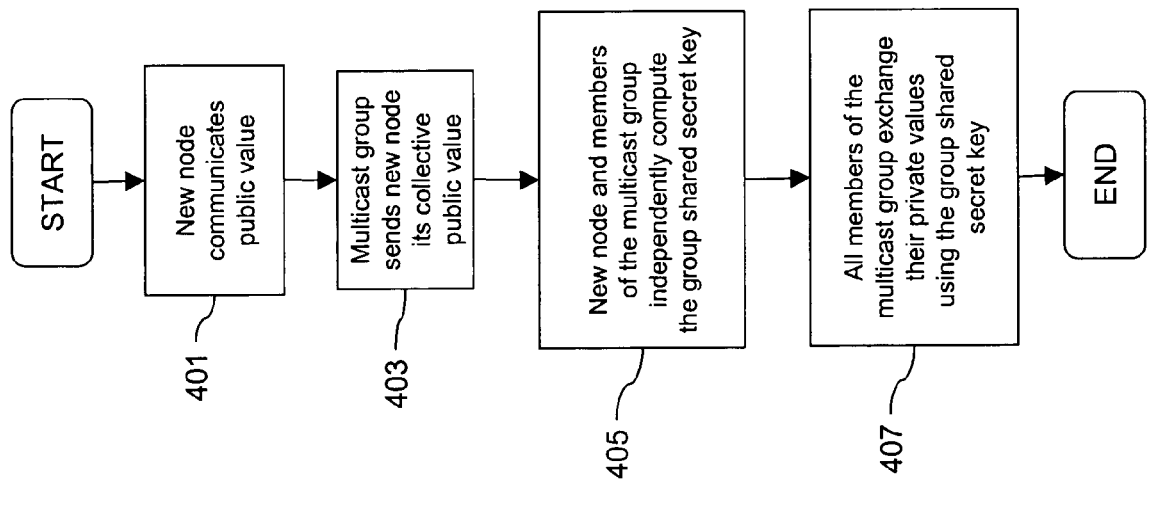

FIG. 4C is a flow diagram showing a method of carrying out the binary approach. The method assumes that a multicast group of one or more nodes or users is in existence. If two or more nodes make up the multicast group, the method further assumes that the group is communicating over a secure channel such that each member of the multicast group possesses or has knowledge of the group shared secret key.

In step 401, a new node that wishes to join the existing multicast group communicates the new node's public value to the multicast group. In an exemplary embodiment, step 401 is carried out by a directory that stores the public value for ready access by the members of the multicast group.

In step 403, the multicast group sends the new node the collective public value of the multicast group. The computation of this public value is more fully discussed below with respect to FIG. 4D. Based upon each other's public key, the new node and the multicast group members independently compute a new group shared secret key, as shown by step 405. With this new group shared secret key, all members of the new multicast group can exchange their private values, as shown by step 407. Accordingly, secure communication can be achieved.

FIG. 4D is a flow diagram of the foregoing process in greater detail. FIG. 4D shows a key exchange protocol to arrive at a shared secret key in a context involving four nodes or users A, B, C, D. In step 411, A and B compute a shared secret key, $k=p^{ab}$ mod (q), thereby forming entity 441 in a manner similar to the standard two party Diffie-Hellman method. A and B each publishes its respective public key ($\mathbb{A}=p^a$ mod (q) and $\mathbb{B}=p^b$ mod (q)). User A obtains B's public key to compute $\mathbb{B}^a$ mod (q), which equals $p^{ab}$ mod (q); user B performs a similar computation based on A's public key.

Once A and B have reached a shared secret key, they exchange their private numbers, a and b. Numbers a and b are randomly generated integers and are embedded in messages that are sent by users A and B to each other. These messages can be signed by the sending node using a private key that differs from the sending node's private number. In one embodiment, the private key may be a permanent private key. By using separate private keys, the multicast group obtains an additional level of security.

Assume that currently, the multicast group includes users A and B; however, user C has a message to send to both A and B. As a result C seeks to join the multicast group. In step 413, user C communicates its public value, $\mathbb{C}=p^c$ mod (q), to the other users, A and B, within the established multicast group. Next, as shown in step 415, a public key value, $\mathbb{AB}$, determined by users A and B, is sent to user C by either A or B.

$$\mathbb{AB}=k_{ab}{}^{ab} \bmod (q) = p^{(ab)(ab)} \bmod (q) \quad (11)$$

According to Equation (11), the private number of the formed entity or multicast group, AB, is the product of the individual private numbers a and b, raised to a power that is a function of the number of nodes within the formed entity. Thus, the private value of AB is $(ab)^2$.

In the preferred embodiment, the last member to join the group has responsibility of transferring the collective public key value to a "joining" node. Thus, user B transmits public key $\mathbb{AB}$ to C. At the time of joining the multicast group, new member C has knowledge of only one entity, which may be one or more nodes; in this example, A and B form one entity. A and B independently compute the shared secret in step 417, using Equation 12:

$$k_{abc} = \mathbb{C}^{(ab)(ab)} \bmod (q) = p^{(ab)(ab)c} \bmod (q) = p^{(ab^{**}2)c} \bmod (q) \quad (12)$$

A and B are able to compute the shared secret key because they know each other's randomly generated private numbers a and b. This computation, operationally, can be accomplished by tracking the number of times each of the nodes has undergone multicast membership joins. In this instance, A and B have been involved with multicast joins twice, while user C has done so only once.

User C computes the group shared secret key as follows:

$$k_{abc} = (\mathbb{AB})^c \bmod (q) = p^{(ab)(ab)c} \bmod (q) = p^{(ab^{**}2)c} \bmod (q) \quad (13)$$

Now that a group shared secret key has been computed by all the members of the "new" multicast group, the members exchange their private values to begin communicating over a secure channel, as shown in step 419.

Assume that another user D now wants to communicate with all the users of the multicast group. User D communicates its public value, $\mathbb{D}(=p^d \bmod (q))$ to the multicast group, as shown by step 421. In step 423, the multicast group transfers an agreed upon collective public value, ABC, to D. According to one embodiment, C is designated as the member to convey value, ABC, to user D, and the value ABC is:

$$\mathbb{ABC}=k_{abc}{}^{abc} \bmod (q) = p^{(((ab)(ab)c)(abc))} \bmod (q) = p^{(ab^{}3)(c^{}2)} \bmod q \quad (14)$$

Based on Equation (14), the private value for the multicast group is $(ab)^3(c^2)$. Thus, the multicast group private value is the product of the private values of the nodes raised to the number of times each node has been in group formations. This is advantageous because the collective public key can be derived by having each node track the number of times it has participated in multicast group formation. With this information, in step 425 the user D, as the new node, can compute a new group shared secret key, $k_{abcd}$:

$$k_{abcd} = (\mathbb{ABC})^d \bmod (q) = p^{(((ab)(ab)c))(abc)d} \bmod (q) = p^{(ab^{}3)(c^{}2)d} \bmod (q) \quad (15)$$

Likewise, the other members A, B, C of the multicast group calculate the new group shared secret key.

In the preferred embodiment, the processes shown in FIG. 4A, FIG. 4B, FIG. 4C, FIG. 4D may be implemented as one or more computer-executed instructions, processes, programs, subroutines, functions, or their equivalents. In an embodiment, each workstation 103, 105, 107, 109 is a general-purpose computer of the type shown in FIG. 8 and described herein in connection with FIG. 4A, FIG. 4B, FIG. 4C, FIG. 4D. The cryptographic devices 103a, 105a and the key generators 103b, 105b are one or more computer-executed instructions, processes, programs, subroutines, functions, or their equivalents. Further, embodiments may be implemented as discrete hardware circuitry, a plurality of computer instructions (computer software), or a combination of discrete hardware circuitry and computer instructions.

Once a distributed group controller or MKDC of FIG. 2A, FIG. 2B, FIG. 2C has established secure communication using any one of the key exchange methods, the distributed group controller may efficiently disseminate and maintain the group session keys for the members of the multicast group of users A-H. According to the present invention, a tree structure is used. In the tree structure, the MKDC can be implemented as a group controller that is joined with other MKDCs in the tree to enable communication of keys among them. This arrangement enables secure communications between the MKDCs.

Figure 5:
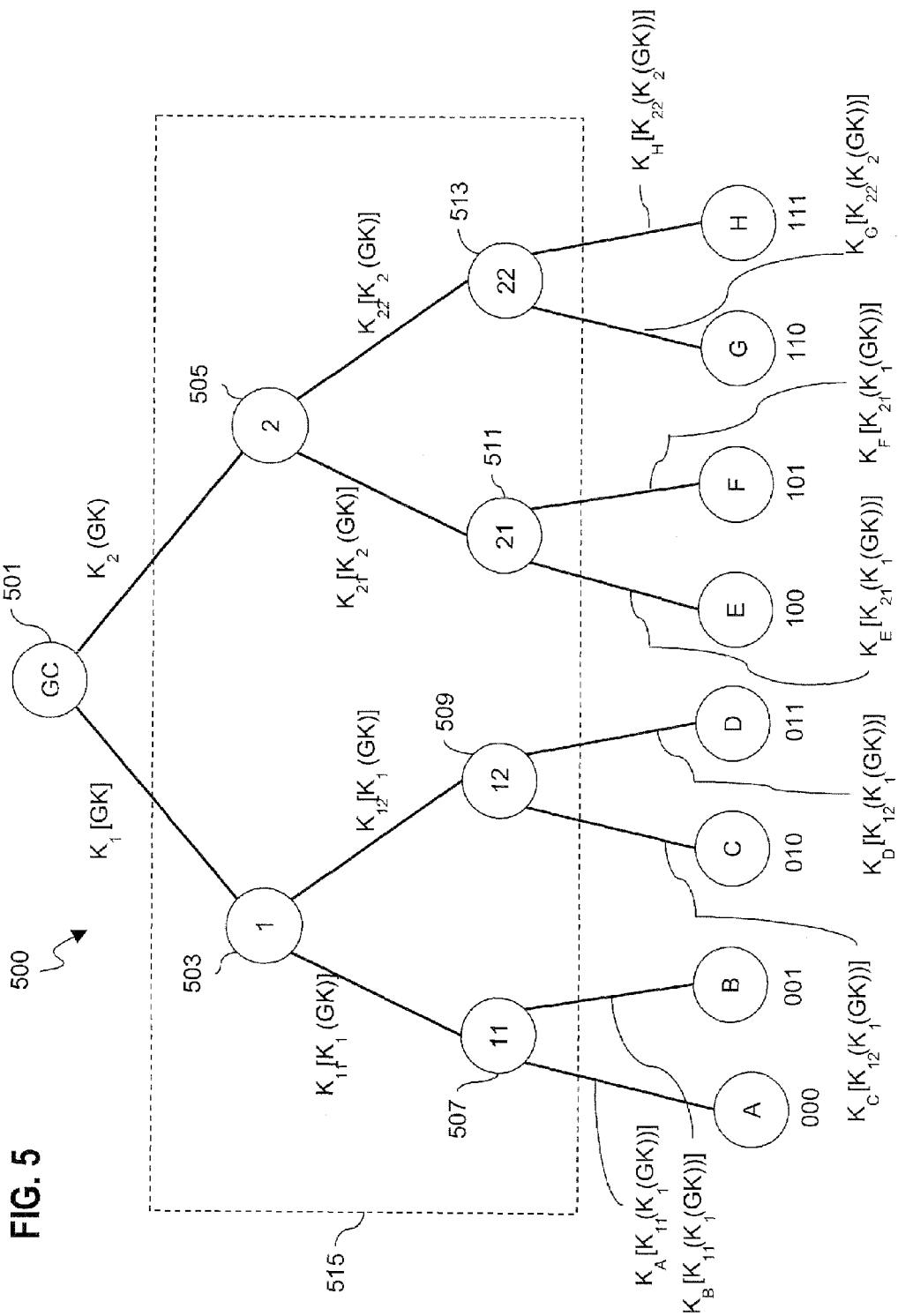
FIG. 5 is a diagram of a binary tree approach to key management used in the systems of FIG. 2A, FIG. 2B, and FIG. 2C.

FIG. 5 shows a binary tree structure for key management among a multicast group. In the binary tree approach, users, clients or nodes of a multicast group are mapped to leaf nodes of a binary tree 500. Root node 501 represents the distributed group controller. In one embodiment, leaf nodes are associated with users A-H. Each leaf node forms a point-to-point secure channel with group controller 501. Thus, intermediate nodes 515 are not true nodes and are not associated with software or hardware elements of a network, but rather serve to conceptually illustrate how each leaf obtains the group session key (GK).

Group controller node 501 has the responsibility of encrypting $2\log_2 N+1$ keys and sending the keys to nodes A-H via a multicast message. The actual messages that are transmitted by group controller 501 contain, for example, information about the key's identification, revision, and version. Alternatively, group controller node 501 may send $2\log_2 N+1$ messages to each group member individually. Each leaf node A-H stores $\log_2 N$ keys, in which one of the keys is the particular node's private key and the remaining keys are shared among some of the other nodes.

Labels along the branches of binary tree 500 show how the group key GK is encoded for each member of the multicast group. The group key undergoes successive encryption by the private keys of nodes of all branches.

For example, for the branch comprising nodes 501, 503, 507 and user A, group key GK is first encrypted using the private key, $K_1$, of node 503. These keys are then encrypted using the private key, $K_{11}$, of node 507. The private key of user A encrypts these keys. Thus, group controller 501 sends, to user A, the last encrypted message, $K_A[K_{11}(K_1(GK))]$. When user A receives this encrypted message, it decrypts using its private key and utilizes the corresponding shared keys until the group key is determined. Under this arrangement, no one leaf has knowledge of all the shared keys, thereby providing an extra level of security.

In another embodiment, intermediate nodes 515 of the binary tree 500 represent actual multicast group members. This arrangement more naturally accommodates superimposition of multicast routing trees, reliable multicasting transport trees, hierarchical cache chaining structures, and directory trees. Using intermediate nodes 515, the number of group members and keys is $2^{N+1}-1$, and each group member stores $\log_2 n$ keys, where n defines the level in a tree, ranging from 0 to N, and N is the number of nodes in the tree. In contrast, an embodiment that employs only leaves of the binary tree 500 accommodates N nodes and $2^{N+1}-1$ total keys, in which each node has $\log_2 N$ keys.

Under this scheme, there is flexibility in implementation with regard to joining and leaving the multicast group. The number of keys affected is essentially $2\log_2 N-2\log_2 n$. In the first option, the intermediate node, for example node 503, behaves as a group controller for its branch by changing the keys of the affected nodes within its branch. This first option reduces the workload on the group controller 501. As a second option, the intermediate node 503 requests a new session key from the group controller 501 or requests permission to create a new session key.

In the case where the group controller 501 creates a new group session key, the group controller 501 encrypts the new session key with the private key of the intermediate node 503. However, if the group session key results from a member leaving the multicast group, the intermediate node 503 changes its key(s) since such keys were known by the leaving node. To do so, the intermediate node has a separate secured private channel with the group controller 501. Using this private channel, the intermediate node sends the group controller 501 its updated keys. Alternatively, the intermediate node (which is acting as a sub-group controller) decrypts the group session key from the group controller 501 and then encrypts the group session key with the newly created keys associated with the affected nodes.

In yet another embodiment of the binary tree method, the private keys of the nodes can be made to correspond to an address identification. Assuming that there is an address space of $2^N$ member nodes, each member is identified by a word of N bits in length. For example, users A-H are assigned 000-111, respectively. Further, each bit in the address ID can be considered to correspond to a private key, and the total number of keys is 2N.

In an exemplary embodiment, address IDs can be hierarchically assigned, in which the most significant bits (MSBs) represent node members closer to the root node and group controller. When a node joins the multicast group, group controller 501 distributes N keys, corresponding to bit values of the joining node, by embedding these keys in the address identifier of the new node after version incrementing it. In the case where the node leaves the group, the group controller 501 communicates a new group session key encrypted in the remaining N keys that were unaffected by the node leaving. The group controller 501 also broadcasts the new version of the affected N keys encrypted in the new group key and the old set of N keys.

IP address and time coordinates of a directory node may be used to derive a unique address identifier for a node that is joining a multicast group. However, this does not result in a contiguous sequence or address space of the identifiers. To obtain identifiers that are within a contiguous address space, the identifiers may be issued by a central registration authority or appropriately hashed. Directory replication can be utilized to implement a distributed MKDC, as shown in FIG. 2B and FIG. 2C. According to a preferred embodiment, an X.500 directory or LDAP directory operates as a mechanism for key distribution and provides a logical infrastructure for the tree approach described above. When the directory is replicated, an MKDC can obtain a common group session key from a local copy of the directory.

Figure 6A:
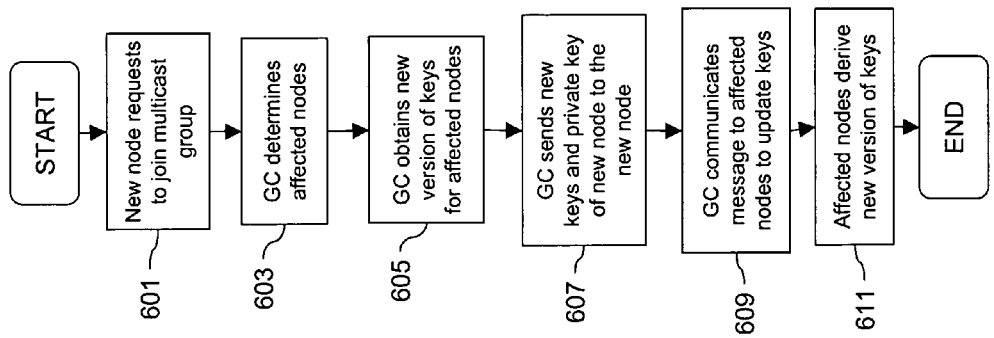
FIG. 6A and FIG. 6B are a flow chart and a diagram, respectively, of an exemplary embodiment of the operation of the group controller of FIG. 2A, FIG. 2B, FIG. 2C related to joining of the multicast group.

FIG. 6A is a flow chart that shows a process of a node joining a multicast group according to the binary tree algorithm of FIG. 5. In relation to FIG. 5, joining the multicast group means assuming a leaf position on the binary tree 500 or creating and storing a new node at the level of leaf nodes A-H. Because the shared keys along a branch with the new leaf are required to be updated, those nodes along this particular branch are affected by the addition.

As shown by step 601, a node that desires to be a part of the multicast group first sends a request to the group controller 501. The group controller 501 determines which nodes are affected by this join, as shown by step 603. The group controller 501 generates new versions of the keys of the affected nodes, as shown by step 605.

In step 607, group controller 501 sends these new versions of the shared keys and a unique private key to the new node. In step 609 the group controller 501 transmits a message to the affected nodes, instructing the nodes to update their keys by changing the revision numbers. Each of the affected nodes, in response to the message, derives a new version of its keys, as shown by step 611. In the preferred embodiment, each affected node performs a one way hash to compute the new version of the keys. Such an approach permits the generation of unique keys to be synchronized between the member nodes and the group controller without having to transmit the actual keys, thereby reducing the probability of security leaks.

Figure 6B:
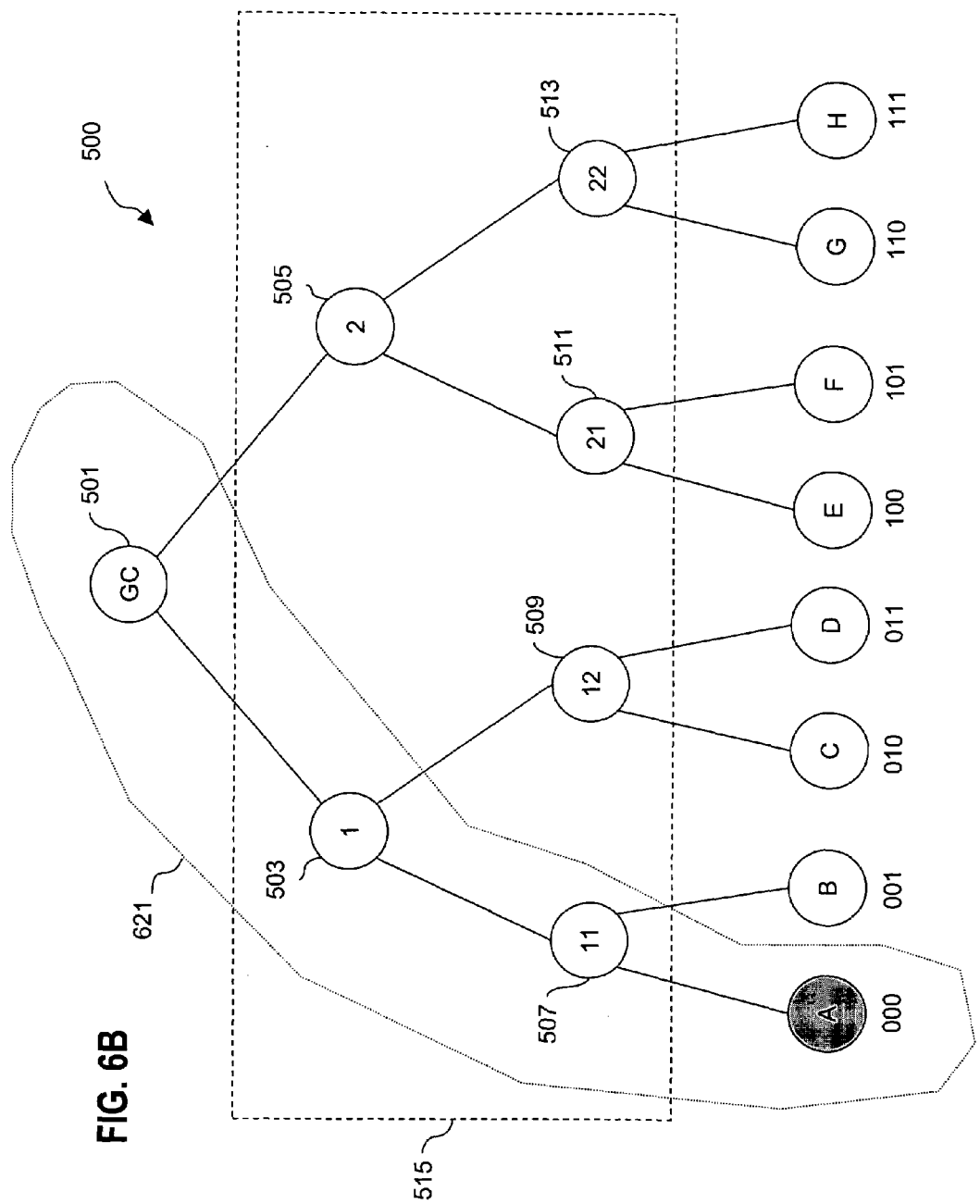

FIG. 6B provides an exemplary illustration of a user joining the multicast group. In this example, user A, who seeks to join, sends a request message to group controller node 501 over an unsecured channel. Because user A belongs in the left branch 621 of the binary tree 500, the affected nodes in this instance are nodes 503, 507. These nodes are required to update their keys by performing a one way hash function on the current version of their keys when instructed by group controller 501. The group controller 501 transmits the shared keys of the nodes along branch 621 to user A along with user A's private key. Thus, user A is able to derive the group session key and securely communicate with the other members of the multicast group. The group controller 501 is also responsible for managing the keys when a node leaves the multicast group.

Figure 7A:
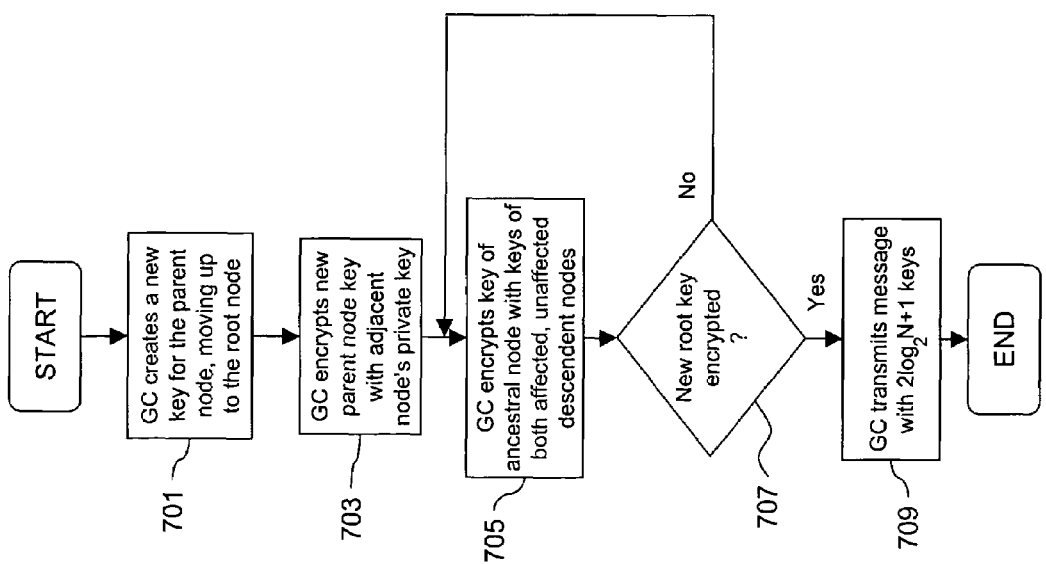
FIG. 7A and FIG. 7B are a flow chart and a diagram, respectively, of an exemplary embodiment of the operation of a group controller of FIG. 2A, FIG. 2B, FIG. 2C related to leaving the multicast group.

FIG. 7A is a flow chart that shows a process of managing keys within the multicast group when a group member leaves. In this case, all the keys known to the "leaving" node are version controlled to prevent such user from intercepting future messages exchanged among the multicast group.

Accordingly, in step 701, group controller 501 generates a new key for the parent of the leaving node as well as all ancestral nodes until the root node is reached. The group controller 501 also creates new keys for the sub-branches hanging off from the sub-nodes that fall on the path from the departed node to the root node. In particular, the group controller 501 encrypts a new key of the parent node with the adjacent node's private key, as shown by step 703.

The key of the immediate ancestral node (which in this instance is the grandparent of the leaving node) is encrypted with the keys of both affected and unaffected descendent nodes, as indicated by step 705. The group controller 501 then determines whether the new root key has been encrypted, as shown by step 707. If the root key 501 has not been encrypted, then step 705 is repeated until the root key 501 is encrypted with its two child nodes. In fact, once the root node 501 has been updated, all the keys are transferred to each of the users of the affected branch 720 in one message containing $2\log_2 N+1$ keys.

Figure 7B:
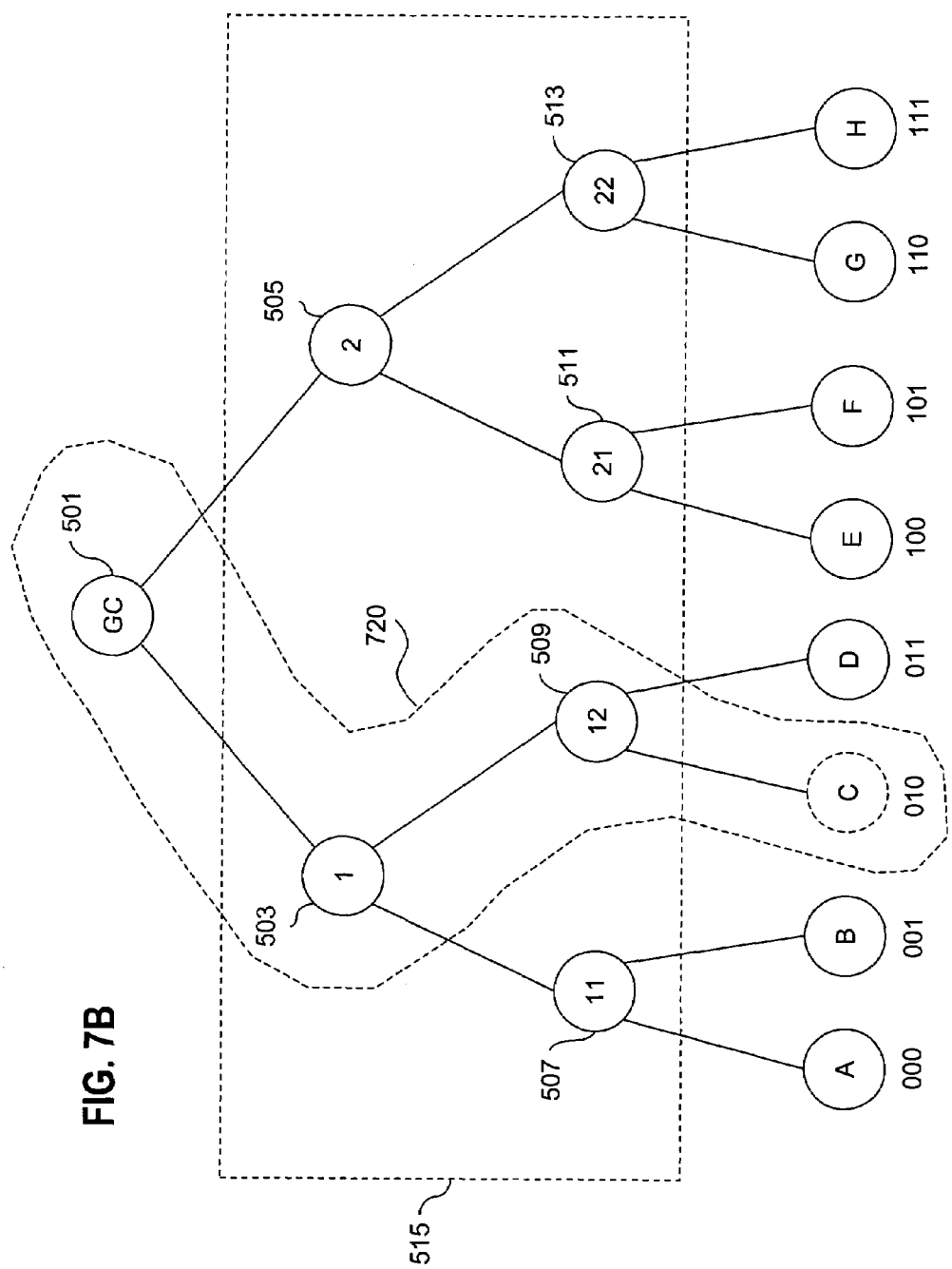

FIG. 7B is a diagram that illustrates the process of FIG. 7A in an example case in which user C terminates its membership in the multicast group. As described above, group controller 501 creates a new key for each ancestral node along the path 720 of the leaving node; i.e., node 509 of user C, a new key for the grandparent node 503, and a new group session key.

Accordingly, a directory may be used as infrastructure to build secure communications among a plurality of MKDCs. Each address has two keys for each bit in the address value. If the value of a particular bit is 1, then the first key is used, otherwise the second key is used. All nodes have overlapping keys and no single node has all keys. An administrator can determine a group session key, update one directory domain with the group session key, and directory replication then causes the keys to be replicated. As a result, keys become locally available to all nodes that need them.

Overcoming the Single Point of Failure

The binary tree approach makes it possible to scale a secure communication system to large multicast groups, with less overhead involved in transmission of new group session keys when members join in a multicast group. Advantageously, when a member joins or leaves, the central group controller, which acts as a group membership coordinator, sends only a subset of keys to existing group members on an affected tree branch. One issue with this approach, however, is that the central group controller presents a single point of failure.

Figure 10A:
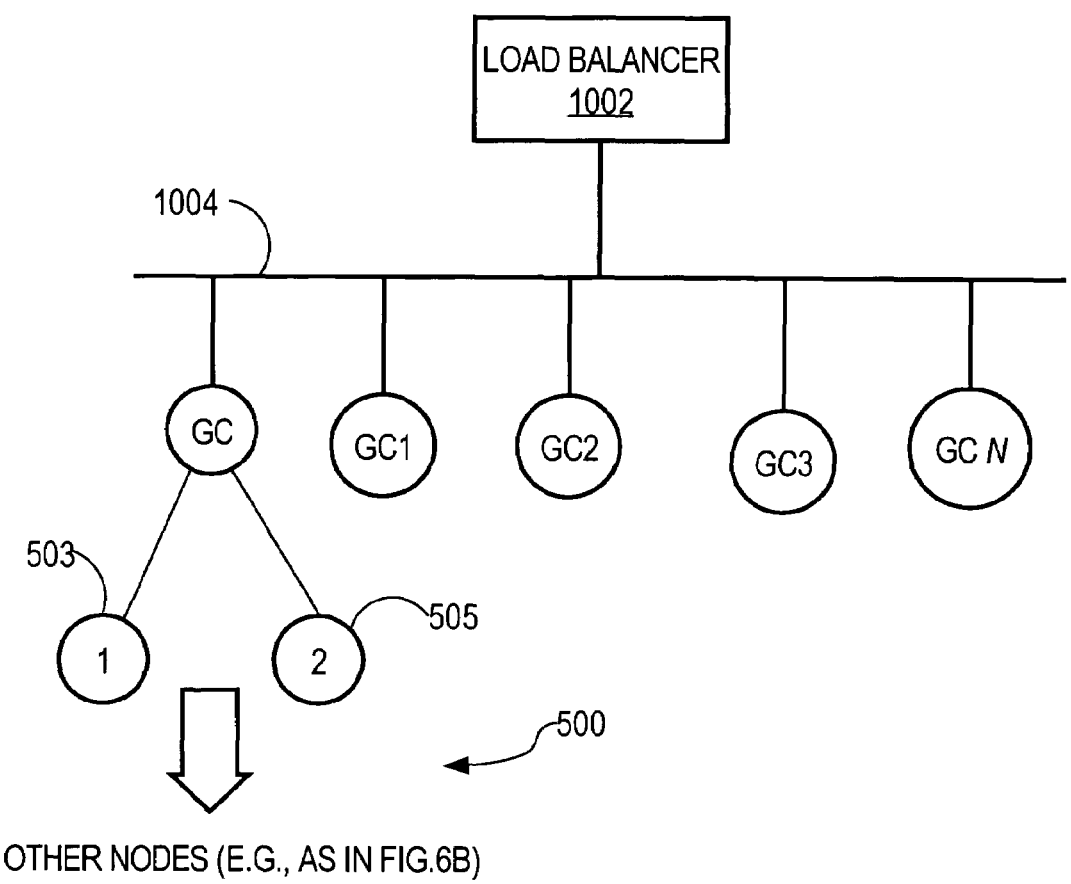
FIG. 10A is a block diagram of a secure communication system using a plurality of group controllers to avoid a single point of failure in a binary tree approach.

FIG. 10A is a block diagram of a secure communication system using a plurality of group controllers to avoid a single point of failure in a binary tree approach.

A plurality of replicated group controllers GC, GC1, GC2, GC3, GC N are communicatively coupled by network 1004. Any number of group controllers may be joined in such a network, as indicated by the designation GC N. A load balancer 1002 controls direction of communication requests to the group controllers. Each group controller GC, GC1, etc., is a replica of a group controller of the type shown in FIG. 6B and exemplified by group controller 501. Thus, each group controller GC, GC1, etc. manages a plurality of nodes arranged in a binary tree, such as binary tree 500 associated with group controller 501.

In one embodiment, load balancer 1002 handles unicast IP-based requests, which may comprise UDP or TCP requests. A commercial product that is suitable for use as load balancer 1002 is LocalDirector, commercially available from Cisco Systems, Inc., San Jose, Calif.

The load balancer 1002 is addressable using a single virtual IP address. In this configuration, the plurality of group controllers GC, GC1, etc. appear to external elements as a single virtual group controller akin to a server farm. A request can be sent to the load balancer 1002 which will transparently distribute the request to one of the group controllers. Thus, the load balancer 1002 and the group controllers that it supervises act as a Distributed Group Controller Server.

The group controllers GC, GC1, etc. coordinate among each other to establish one of the group controllers as a controlling node or master node for the purpose of generating group session keys. The group controllers may create new group session keys, and other keys for nodes in an affected branch when a node leaves or joins a group, using the approaches disclosed in the above-referenced co-pending application entitled "METHOD AND APPARATUS FOR CREATING A SECURE COMMUNICATION CHANNEL AMONG MULTIPLE EVENT SERVICE NODES."

Preferably, responsibility for creation of the keys is successively assigned to different group controllers, in real time and in serial manner, by rotating a token among the group controllers. One group controller holds the token at a time, and passes the token to another group controller after a predetermined period of time. The group controller holding the token is able to admit a new node and also create the keys. A group controller not holding the token does not admit nodes and waits to receive the token before admitting a node or creating keys. Thus, in effect, a joining node can contact any group controller in order to join in any group, however, some latency may occur until the token is received at the group controller if that group controller does not have the token.

Figure 10B:
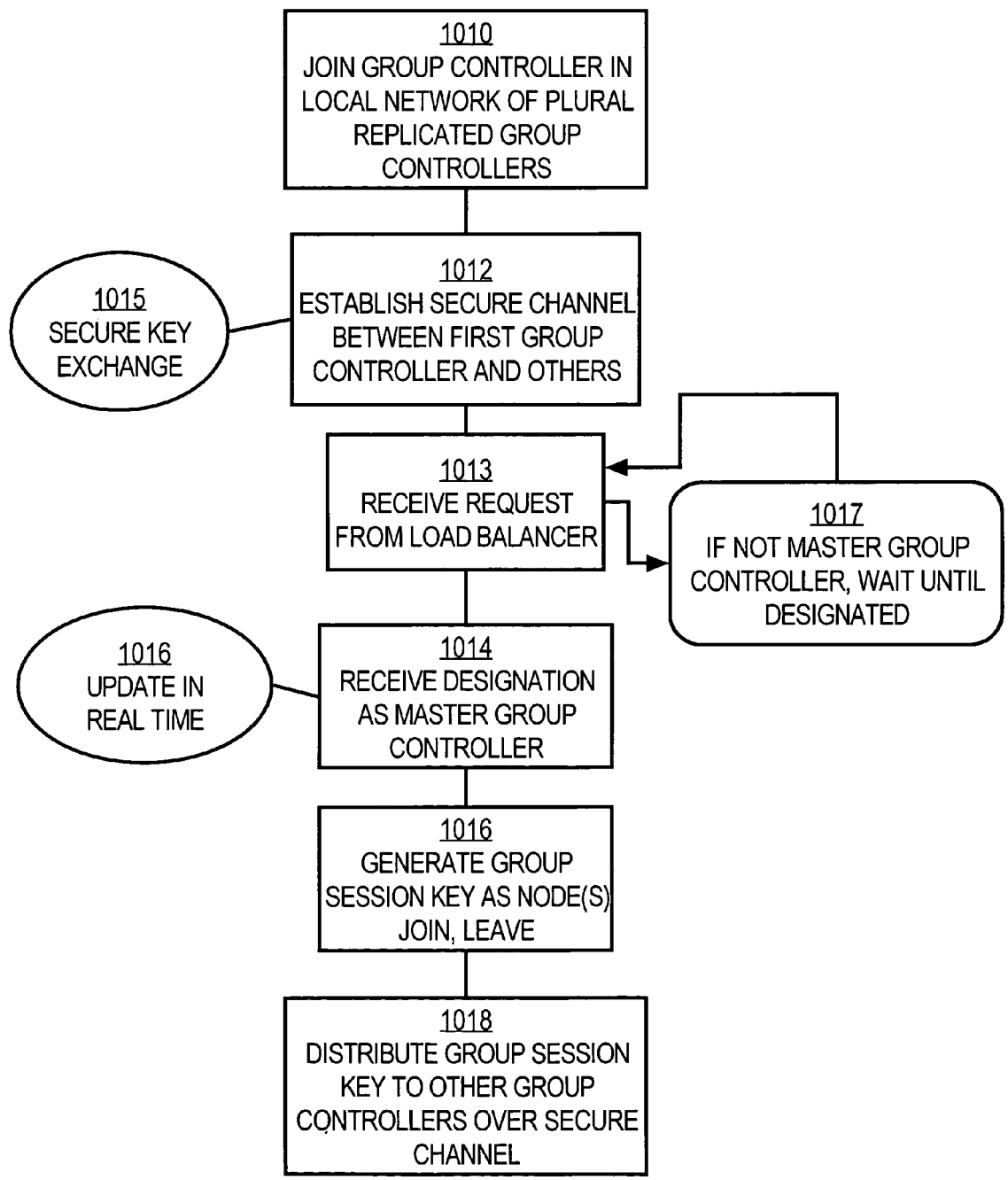
FIG. 10B is a flow diagram of a method of using a secure communication system in a manner that avoids a single point of failure.
Figure 10C:
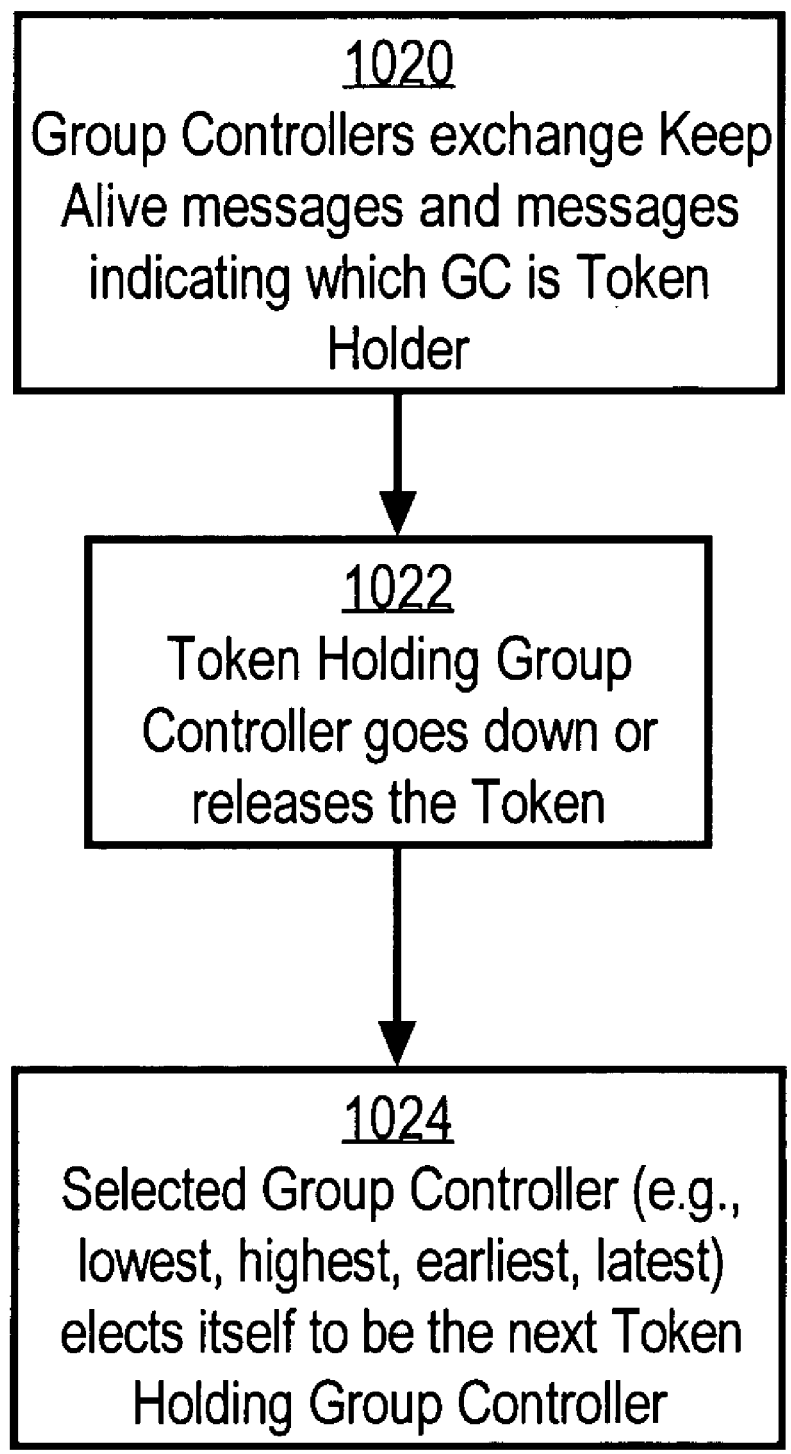
FIG. 10C is a flow diagram of a method of selecting a logical or token holding group controller.

FIG. 10C is a flow diagram of a method of selecting a logical or token holding group controller.

In block 1020, a plurality of group controllers exchange Keep Alive messages and messages indicating which group controller is the current token holder. The Keep Alive messages are merely one example of a mechanism whereby a particular group controller may inform the other group controllers that the particular group controller is online and working. Any other notification mechanism may be used.

In block 1022, the group controller that is currently holding the token crashes or otherwise becomes unavailable. In block 1024, a different selected group controller elects itself to be the next token holding group controller. That group controller may be selected based on a creation value, a numeric identifier, a timestamp, etc. Block 1022 and block 1024 represent a contingency response to a crash; if a crash never occurs then a particular group controller could hold the token indefinitely, or could voluntarily release it and notify the other group controllers.

The group controllers GC, GC1, etc. send the new group session keys to one another on a secured channel. Thus, network 1004 is a secured channel. The group controllers may build a secured channel among themselves for this purpose using one of the approaches for key exchange that are disclosed in the above-referenced co-pending applications entitled "OPERATIONAL OPTIMIZATION OF A SHARED SECRET DIFFIE-HELLMAN KEY EXCHANGE AMONG BROADCAST OR MULTICAST GROUPS," and "PROCESSING METHOD FOR KEY EXCHANGE AMONG BROADCAST OR MULTICAST GROUPS THAT PROVIDES A MORE EFFICIENT SUBSTITUTE FOR DIFFIE-HELLMAN KEY EXCHANGE." Alternatively, standard Diffie-Hellman key exchange may be used. In still another alternative, Burmeister-Desmedt Conference Key Distribution Protocol is used.

FIG. 10B is a flow diagram of a method of establishing and using a secure communication without a single point of failure.

In block 1010, a group controller is joined in a local network of plural replicated group controllers. For example, block 1010 may involve joining group controller GC of FIG. 10A to network 1004 comprising group controllers GC1, GC2, etc., each of which is a replica of GC.

In block 1012, a secure channel is established between the first group controller, e.g., GC, and the other replica group controllers. Block 1012 may involve building a secure channel using secure exchange, as indicated by block 1015, using Diffie-Hellman key exchange or one of the mechanisms described above.

In block 1013, a request is received from a load balancer that manages routing of requests to the group controllers in the local network. For example, block 1013 may involve receiving a TCP/IP or UDP request at a load balancer that governs distribution of requests to the group controllers. The request is for a node to join or leave a multicast or broadcast group of the secure communication system. In response, the load balancer distributes the request to one of the group controllers.

If the request is received at a group controller that is not currently designated as a master group controller, then the group controller waits until it is designated as master before admitting a node to a group or allowing a node to leave a group, as indicated by block 1017.

In block 1014, the group controller receives a designation as a master group controller. The designation is updated in real time, as indicated by block 1016. Designation and updating may involve continuous real-time token passing of the type described above. When a group controller is designated as master, it may generate new group session keys as nodes join and leave multicast or broadcast groups, as shown by block 1016. When a new group session key is created by a group controller, that group controller distributes the new group session key to all other group controllers over the secure channel of the local network, as indicated by block 1018.

Accordingly, a highly scalable secure communication system without a single point of failure is provided.

Hardware Overview

Figure 8:
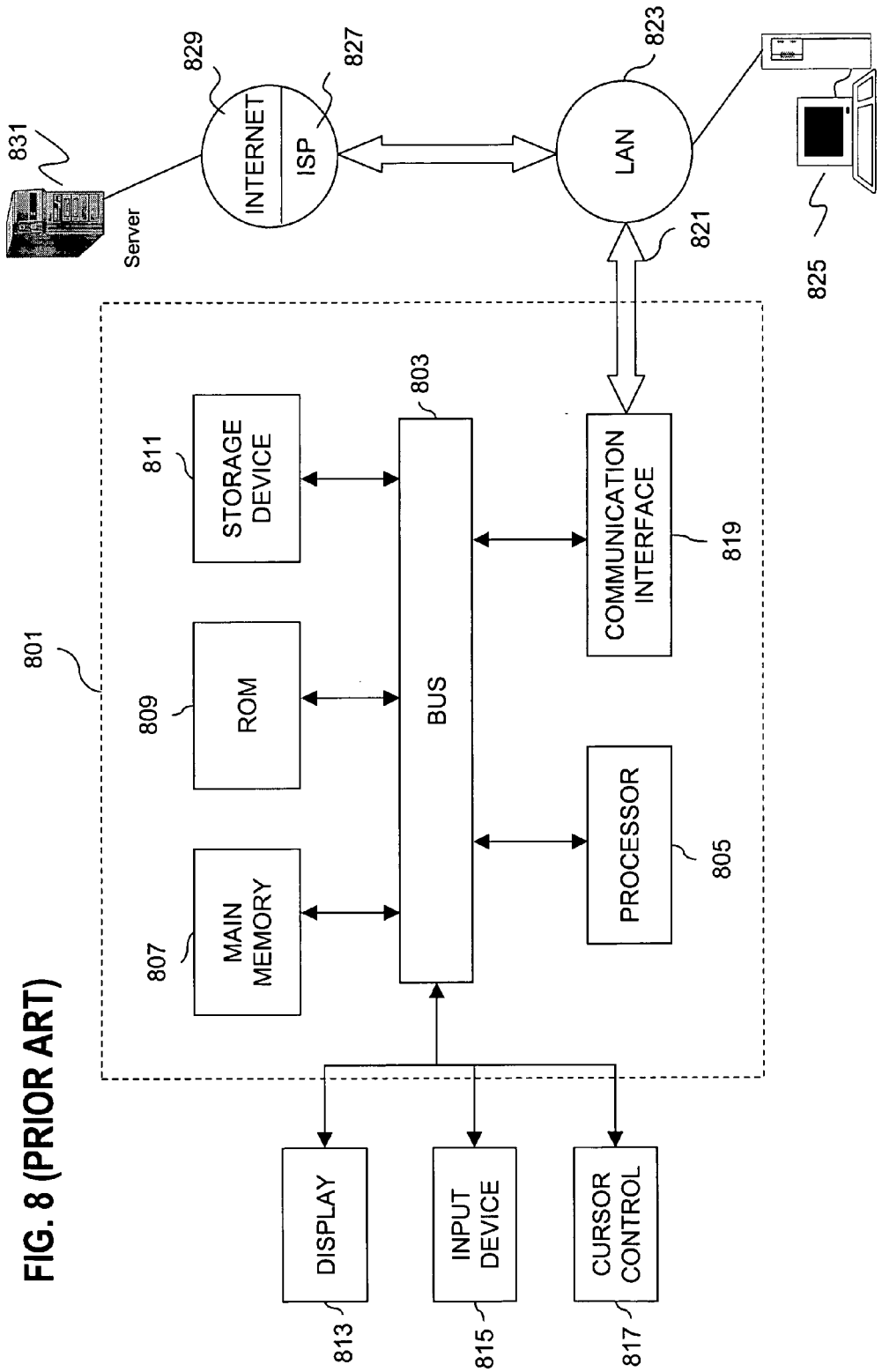
FIG. 8 is a block diagram of a computer system on which embodiments of the group controller of FIG. 2A, FIG. 2B, FIG. 2C may be implemented.
Figure 9:
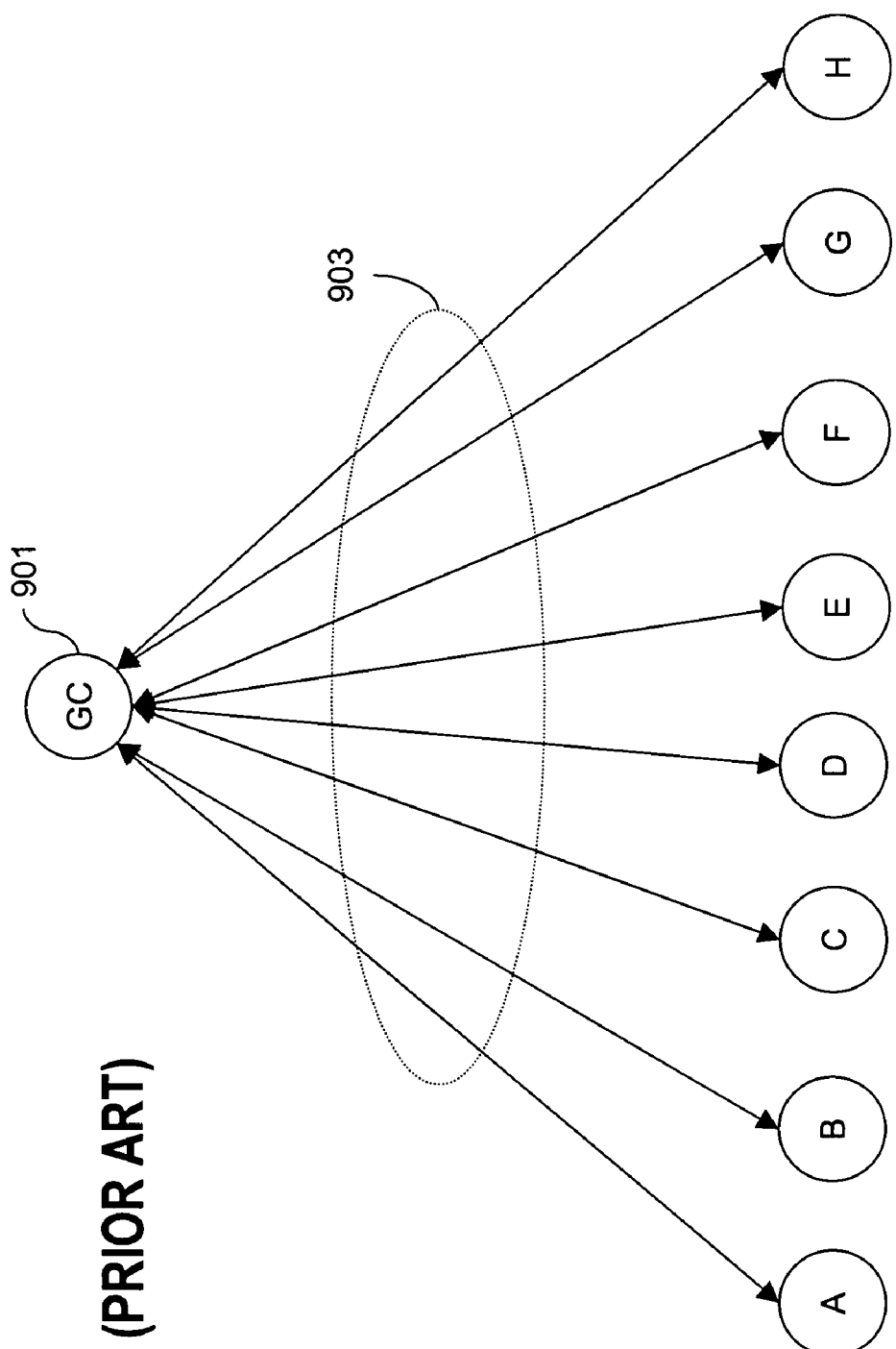
FIG. 9 is a diagram of a conventional secure communication system using a single centralized group controller.

FIG. 8 illustrates a computer system 801 upon which an embodiment may be implemented. Such a computer system 801 may be configured as a user node or server node to provide the various security and directory services as earlier discussed. Computer system 801 includes a bus 803 or other communication mechanism for communicating information, and a processor 805 coupled with bus 803 for processing the information. Computer system 801 also includes a main memory 807, such as a random access memory (RAM) or other dynamic storage device, coupled to bus 803 for storing information and instructions to be executed by processor 805. In addition, main memory 807 may be used for storing temporary variables or other intermediate information during execution of instructions to be executed by processor 805. Notably, the values associated with tracking the number of times a node engages in multicast group formation may be stored in main memory 807. Computer system 801 further includes a read only memory (ROM) 809 or other static storage device coupled to bus 803 for storing static information and instructions for processor 805. A storage device 811, such as a magnetic disk or optical disk, is provided and coupled to bus 803 for storing information and instructions. With respect to the system of FIGS. 2A-2C, information on the binary tree structure can be stored in device 811 for manipulation by processor 805.

Computer system 801 may be coupled via bus 803 to a display 813, such as a cathode ray tube (CRT), for displaying information to a computer user. An input device 815, including alphanumeric and other keys, is coupled to bus 803 for communicating information and command selections to processor 805. Another type of user input device is cursor control 817, such as a mouse, a trackball, or cursor direction keys for communicating direction information and command selections to processor 805 and for controlling cursor movement on display 813.

Embodiments are related to the use of computer system 801 to implement a public key exchange encryption approach for securely exchanging data between participants. According to one embodiment, the public key exchange encryption approach is provided by computer system 801 in response to processor 805 executing one or more sequences of one or more instructions contained in main memory 807. Such instructions may be read into main memory 807 from another computer-readable medium, such as storage device 811. Execution of the sequences of instructions contained in main memory 807 causes processor 805 to perform the process steps described herein. One or more processors in a multi-processing arrangement may also be employed to execute the sequences of instructions contained in main memory 807. In alternative embodiments, hard-wired circuitry may be used in place of or in combination with software instructions. Thus, embodiments are not limited to any specific combination of hardware circuitry and software.

The term "computer-readable medium" as used herein refers to any medium that participates in providing instructions to processor 805 for execution. Such a medium may take many forms, including but not limited to, non-volatile storage media, volatile storage media, and transmission media. Non-volatile storage media includes, for example, optical or magnetic disks, such as storage device 811. Volatile storage media includes dynamic memory, such as main memory 807. Transmission media includes coaxial cables, copper wire and fiber optics, including the wires that comprise bus 803.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable storage media may be involved in carrying one or more sequences of one or more instructions to processor 805 for execution. For example, the instructions may initially be carried on a magnetic disk of a remote computer. The remote computer can load the instructions relating to computation of the shared secret key into its dynamic memory and send the instructions over a telephone line using a modem. A modem local to computer system 801 can receive the data on the telephone line and use an infrared transmitter to convert the data to an infrared signal. An infrared detector coupled to bus 803 can receive the data carried in the infrared signal and place the data on bus 803. Bus 803 carries the data to main memory 807, from which processor 805 retrieves and executes the instructions. The instructions received by main memory 807 may optionally be stored on storage device 811 either before or after execution by processor 805.

Computer system 801 also includes a communication interface 819 coupled to bus 803. Communication interface 819 provides a two-way data communication coupling to a network link 821 that is connected to a local network 823. For example, communication interface 819 may be a network interface card to attach to any packet switched LAN. As another example, communication interface 819 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 819 sends and receives electrical, electromagnetic or optical signals that carry digital data streams representing various types of information.

Network link 821 typically provides data communication through one or more networks to other data devices. For example, network link 821 may provide a connection through local network 823 to a host computer 825 or to data equipment operated by an Internet Service Provider (ISP) 827. ISP 827 in turn provides data communication services through the Internet 829. Local network 823 and Internet 829 both use electrical, electromagnetic or optical signals that carry digital data streams. The signals through the various networks and the signals on network link 821 and through communication interface 819, which carry the digital data to and from computer system 801, are exemplary forms of carrier waves transporting the information.

Computer system 801 can send messages and receive data, including program code, through the network(s), network link 821 and communication interface 819. In the Internet example, a server 831 might transmit a requested code for an application program through Internet 829, ISP 827, local network 823 and communication interface 819. One such downloaded application provides a public key exchange encryption approach for securely exchanging data between participants as described herein.

The received code may be executed by processor 805 as it is received, and/or stored in storage device 811, or other non-volatile storage for later execution. In this manner, computer system 801 may obtain application code in the form of a carrier wave.

The techniques described herein provide several advantages over prior public key exchange encryption approaches for securely exchanging data among multiple participants using a central group controller. The central group controller of the present invention comprises a clustered configuration of multiple servers used in conjunction with a load balancer to eliminate a single point of failure. Further, the central group controller exhibits improved system throughput and scalability.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing addition and deletion of network nodes from and to a secure multicast or broadcast group of network nodes in a communications network without a single point of failure, wherein each of the network nodes is associated with one of a plurality of group controllers, wherein each group controller of the plurality of group controllers is a replica of a particular group controller, and wherein the network nodes and the plurality of group controllers are logically organized in a binary tree that represents the network nodes and the plurality of group controllers, in which leaf nodes of the binary tree represent network nodes that are joining or leaving the secure multicast or broadcast group, intermediate nodes represent other network nodes, and root nodes represent the plurality of group controllers, the method comprising the steps of:

joining a first group controller to the plurality of group controllers in a local network;

establishing a secure communication channel between the first group controller and a second group controller of the plurality of group controllers using a key exchange protocol;

receiving a request to add or delete a network node of the secure multicast or broadcast group from a load balancer that is coupled to the plurality of group controllers;

creating and storing a new group session key for each network node represented in each branch of the binary tree that is affected by adding or deleting the network node from the secure multicast or broadcast group; and distributing a group session key from a third group controller of the plurality of group controllers to the network nodes.

2. A method as recited in claim 1, wherein distributing a group session key further comprises:
receiving a token value at the third group controller to designate the third group controller as having permission to selectively generate the group session key and to generate node keys associated with the intermediate nodes and the leaf nodes; and
creating and storing the group session key only when the third group controller has the token value.

3. A method as recited in claim 1, wherein distributing a group session key further comprises:
determining whether the secure multicast or broadcast group has a network node that is leaving the secure multicast or broadcast group;
determining which of the intermediate nodes are affected by the leaving node;
updating keys associated with the affected intermediate nodes;
generating a new group session key; and
sending the new group session key to the leaf nodes.

4. A method as recited in claim 3, wherein updating keys comprises:
generating a new key of a parent node of the leaving node; and
encrypting the new key of the parent node with a key of a network node adjacent to the parent node.

5. A method as recited in claim 1, wherein distributing a group session key further comprises:
receiving a request message from one of the network nodes to join the secure multicast or broadcast group;
determining which of the intermediate nodes are affected by the joining node;
updating keys associated with the affected intermediate nodes;
generating a new group session key and a private key of the joining node; and
sending a message comprising the new group session key, the private key, and the updated keys of affected intermediate nodes to the joining node.

6. A method as recited in claim 5, wherein updating keys comprises performing a one way hash function on the keys associated with the affected intermediate nodes.

7. A method as recited in claim 1, wherein receiving a request comprises receiving the request at a load balancer having a single virtual address that represents the plurality of group controllers.

8. A method as recited in claim 7, further comprising the step of load balancing network traffic that is directed from a plurality of the network nodes to the plurality of group controllers.

9. A method as recited in claim 1, wherein establishing a secure communication channel comprises exchanging a public key of the first group controller with all other group controllers in the plurality of group controllers based upon optimized broadcast Diffie-Hellman protocol.

10. A method as recited in claim 5, wherein establishing a secure communication channel comprises:
receiving a public key value that is broadcast by the joining node;
sending a collective public key value from the network nodes to the joining node;
computing a shared secret key; and
creating and storing a group shared secret key by exchanging private key values.

11. A computer-readable storage medium comprising one or more sequences of executable instructions for managing addition and deletion of network nodes from and to a secure multicast or broadcast group of network nodes in a communications network without a single point of failure, wherein each of the network nodes is associated with one of a plurality of group controllers, wherein each group controller of the plurality of group controllers is a replica of a particular group controller, and wherein the network nodes and the plurality of group controllers are logically organized in a binary tree that represents the network nodes and the plurality of group controllers, in which leaf nodes of the binary tree represent network nodes that are joining or leaving the secure multicast or broadcast group, intermediate nodes represent other network nodes, and root nodes represent the plurality of group controllers, and which instructions, when executed by one or more processors, cause the processors to carry out the steps of:
joining a first group controller to the plurality of group controllers in a local network;
establishing a secure communication channel between the first group controller and a second group controller of the plurality of group controllers using a public key exchange protocol;
receiving a request to add or delete a network node of the secure multicast or broadcast group from a load balancer that is coupled to the plurality of group controllers;
creating and storing a new group session key for each network node represented in each branch of the binary tree that is affected by adding or deleting the network node from the secure multicast or broadcast group; and
distributing a group session key from a third group controller of the plurality of group controllers to the network nodes.

12. A computer-readable storage medium as recited in claim 11, wherein distributing a group session key further comprises:
receiving a token value at the third group controller to designate the third group controller as having permission to selectively generate the group session key and to generate node keys associated with the intermediate nodes and the leaf nodes; and
creating and storing the group session key only when the third group controller has the token value.

13. A computer-readable storage medium as recited in claim 11, wherein distributing a group session key further comprises:
determining whether the secure multicast or broadcast group has a network node that is leaving the secure multicast or broadcast group;
determining which of the intermediate nodes are affected by the leaving node;
updating keys associated with the affected intermediate nodes;
generating a new group session key; and
sending the new group session key to the leaf nodes.

14. A computer-readable storage medium as recited in claim 3, wherein updating keys comprises:
generating a new key of a parent node of the leaving node; and
encrypting the new key of the parent node with a key of a network node adjacent to the parent node.

15. A computer-readable storage medium as recited in claim 11, wherein distributing a group session key further comprises:

receiving a request message from one of the network nodes to join the secure multicast or broadcast group;

determining which of the intermediate nodes are affected by the joining node;

updating keys associated with the affected intermediate nodes;

generating a new group session key and a private key of the joining node; and sending a message comprising the new group session key, the private key, and the updated keys of affected intermediate nodes to the joining node.

16. A computer-readable storage medium as recited in claim 15, wherein updating keys comprises performing a one way hash function on the keys associated with the affected intermediate nodes.

17. A computer-readable storage medium as recited in claim 11, wherein receiving a request comprises receiving the request at a load balancer having a single virtual address that represents the plurality of group controllers.

18. A computer-readable storage medium as recited in claim 17, further comprising executable instructions which, when executed by the one or more processors, cause the processors to carry out the step of load balancing network traffic that is directed from a plurality of the network nodes to the plurality of group controllers.

19. A computer-readable storage medium as recited in claim 11, wherein establishing a secure communication channel comprises exchanging a public key of the first group controller with all other group controllers in the plurality of group controllers based upon Diffie-Hellman protocol.

20. A computer-readable storage medium as recited in claim 15, wherein establishing a secure communication channel comprises:

receiving a public key value that is broadcast by the joining node;

sending a collective public key value from the network nodes to the joining node;

computing a shared secret key; and creating and storing a group shared secret key by exchanging private key values.

21. A method of managing addition and deletion of network nodes from and to a secure multicast or broadcast group of network nodes in a communications network, wherein each of the network nodes is associated with a first group controller comprising information that is replicated in a plurality of group controllers, and wherein the network nodes and the plurality of group controllers are logically organized in a binary tree that represents the network nodes and the plurality of group controllers, in which leaf nodes of the binary tree represent network nodes that are joining or leaving the secure multicast or broadcast group, intermediate nodes represent other network nodes, and root nodes represent the plurality of group controllers, the method comprising the steps of:

joining the first group controller in a local network in which the plurality of group controllers are coupled;

establishing a secure channel between the first group controller and the plurality of group controllers through secure key exchange;

receiving a request to add or delete a network node from a load balancer that controls distribution of requests to the plurality of group controllers;

generating a new group session key for each network node represented in each branch of the binary tree that is affected by adding or deleting the network node from the secure multicast or broadcast group; and distributing the group session key from the first group controller to the other group controllers of the plurality of group controllers over the secure channel.

22. A method as recited in claim 21, further comprising the step of generating the group session key only when the first group controller is designated as a master group controller that is authorized to join network nodes and generate group session keys.

23. A method as recited in claim 22, further comprising the step of successively designating different group controllers of the plurality of group controllers as the master group controller in real time.

24. A method for creating a secure multicast or broadcast group, the method comprising the steps of:

establishing a secure communication channel among a plurality of group controllers via a public key exchange protocol;

load balancing traffic emanating from a plurality of network nodes to the plurality of group controllers; and distributing a group session key by one of the group controllers based upon a logical arrangement of the network nodes in a binary tree structure, the binary tree structure having a root node, intermediate nodes, and leaf nodes, wherein the plurality of network nodes correspond to leaf nodes of the binary tree structure and the plurality of group controllers correspond to the root node.

25. The method as recited in claim 24, wherein the step of distributing further comprises:

circulating a token among the plurality of group controllers to designate the one group controller as having permission to selectively generate the group session key and keys associated with the intermediate nodes and the leaf nodes; and selectively generating the group session key based upon the circulating step.

26. The method as recited in claim 24, wherein the step of distributing further comprises:

detecting whether the secure multicast or broadcast group has a network node that is leaving the secure multicast or broadcast group;

determining which of the intermediate nodes are affected in response to the detecting step;

updating keys associated with the affected intermediate nodes;

generating a new group session key; and sending the new group session key to the leaf nodes.

27. The method as recited in claim 26, wherein the step of updating comprises:

generating a new key of a parent node of the leaving node; and encrypting the new key of the parent node with a key of a network node adjacent to the parent node.

28. The method as recited in claim 24, wherein the step of distributing further comprises:

receiving a request message from one of the plurality of network nodes to join the secure multicast or broadcast group;

determining which of the intermediate nodes are affected in response to the receiving step;

updating keys associated with the affected intermediate nodes;

generating a new group session key and a private key of the joining node; and sending a message comprising the new group session key, the private key, and the updated keys of affected intermediate nodes to the joining node.

29. The method as recited in claim 28, wherein the step of updating comprises performing a one way hash function on the keys associated with the affected intermediate nodes.

30. The method as recited in claim 24, further comprising addressing the plurality of group controllers using a single virtual address.

31. A computer system that can manage addition and deletion of network nodes from and to a secure multicast or broadcast group of network nodes in a communications network without a single point of failure, wherein each of the network nodes is associated with one of a plurality of group controllers, wherein each group controller of the plurality of group controllers is a replica of a particular group controller, and wherein the network nodes and the plurality of group controllers are logically organized in a binary tree that represents the network nodes and the plurality of group controllers, in which leaf nodes of the binary tree represent network nodes that are joining or leaving the secure multicast or broadcast group, intermediate nodes represent other network nodes, and root nodes represent the plurality of group controllers, the computer system comprising:
  a load balancer coupled to the plurality of group controllers for interfacing inbound service requests to a selected group controller of the plurality of group controllers;
  a bus coupled to the load balancer for transferring data;
  one or more processors coupled to the bus for selectively generating a group session key under control of program instructions;
  a memory coupled to the one or more processors via the bus;
  one or more sequences of program instructions stored in the memory which, when executed by the one or more processors cause the one or more processors to perform the steps of:
  joining a first group controller to the plurality of group controllers in a local network;
  establishing a secure communication channel between the first group controller and a second group controller of the plurality of group controllers using a key exchange protocol;
  receiving a request to add or delete a network node of the secure multicast or broadcast group from the load balancer that is coupled to the plurality of group controllers;
  creating and storing a new group session key for each network node represented in each branch of the binary tree that is affected by adding or deleting the network node from the secure multicast or broadcast group;
  distributing the group session key from a third group controller of the plurality of group controllers to the network nodes.

32. A computer system as recited in claim 31, wherein distributing a group session key further comprises:
  receiving a token value at the third group controller to designate the third group controller as having permission to selectively generate the group session key and to generate node keys associated with the intermediate nodes and the leaf nodes; and
  creating and storing the group session key only when the third group controller has the token value.

33. A computer system as recited in claim 31, wherein distributing a group session key further comprises:
  determining whether the secure multicast or broadcast group has a network node that is leaving the secure multicast or broadcast group;
  determining which of the intermediate nodes are affected by the leaving node;
  updating keys associated with the affected intermediate nodes;
  generating a new group session key; and
  sending the new group session key to the leaf nodes.

34. A computer system as recited in claim 33, wherein updating keys comprises:
  generating a new key of a parent node of the leaving node; and
  encrypting the new key of the parent node with a key of a network node adjacent to the parent node.

35. A computer system as recited in claim 31, wherein distributing a group session key further comprises:
  receiving a request message from one of the network nodes to join the secure multicast or broadcast group;
  determining which of the intermediate nodes are affected by the joining node;
  updating keys associated with the affected intermediate nodes;
  generating a new group session key and a private key of the joining node; and
  sending a message comprising the new group session key, the private key, and the updated keys of affected intermediate nodes to the joining node.

36. A computer system as recited in claim 35, wherein updating keys comprises performing a one way hash function on the keys associated with the affected intermediate nodes.

37. A computer system as recited in claim 31, wherein receiving a request comprises receiving the request at a load balancer having a single virtual address that represents the plurality of group controllers.

38. A computer system as recited in claim 37, further comprising one or more sequences of program instructions stored in the memory which, when executed by the one or more processors cause the one or more processors to perform the step of load balancing network traffic that is directed from a plurality of the network nodes to the plurality of group controllers.

39. A computer system as recited in claim 31, wherein establishing a secure communication channel comprises exchanging a public key of the first group controller with all other group controllers in the plurality of group controllers based upon optimized broadcast Diffie-Hellman protocol.

40. A computer system as recited in claim 35, wherein establishing a secure communication channel comprises:
  receiving a public key value that is broadcast by the joining node;
  sending a collective public key value from the network nodes to the joining node;
  computing a shared secret key; and
  creating and storing a group shared secret key by exchanging private key values.

41. An apparatus for managing addition and deletion of network nodes from and to a secure multicast or broadcast group of network nodes in a communications network without a single point of failure, wherein each of the network nodes is associated with one of a plurality of group controllers, wherein each group controller of the plurality of group controllers is a replica of a particular group controller, and wherein the network nodes and the plurality of group controllers are logically organized in a binary tree that represents the network nodes and the plurality of group controllers, in which leaf nodes of the binary tree represent network nodes that are joining or leaving the secure multicast or broadcast group, intermediate nodes represent other network nodes, and root nodes represent the plurality of group controllers, the apparatus comprising:

means for joining a first group controller to the plurality of group controllers in a local network;

means for establishing a secure communication channel between the first group controller and a second group controller of the plurality of group controllers using a key exchange protocol;

means for receiving a request to add or delete a network node of the secure multicast or broadcast group from a load balancer that is coupled to the plurality of group controllers;

means for creating and storing a new group session key for each network node represented in each branch of the binary tree that is affected by adding or deleting the network node from the secure multicast or broadcast group; and means for distributing a group session key from a third group controller of the plurality of group controllers to the network nodes.

42. An apparatus as recited in claim 41, wherein the means for distributing a group session key further comprises:

means for receiving a token value at the third group controller to designate the third group controller as having permission to selectively generate the group session key and to generate node keys associated with the intermediate nodes and the leaf nodes; and means for creating and storing the group session key only when the third group controller has the token value.

43. An apparatus as recited in claim 41, wherein the means for distributing a group session key further comprises:

means for determining whether the secure multicast or broadcast group has a network node that is leaving the secure multicast or broadcast group;

means for determining which of the intermediate nodes are affected by the leaving node;

means for updating keys associated with the affected intermediate nodes;

means for generating a new group session key; and means for sending the new group session key to the leaf nodes.

44. An apparatus as recited in claim 43, wherein the means for updating keys comprises:

means for generating a new key of a parent node of the leaving node; and means for encrypting the new key of the parent node with a key of a network node adjacent to the parent node.

45. An apparatus as recited in claim 41, wherein the means for distributing a group session key further comprises:

means for receiving a request message from one of the network nodes to join the secure multicast or broadcast group;

means for determining which of the intermediate nodes are affected by the joining node;

means for updating keys associated with the affected intermediate nodes;

means for generating a new group session key and a private key of the joining node; and means for sending a message comprising the new group session key, the private key, and the updated keys of affected intermediate nodes to the joining node.

46. An apparatus as recited in claim 45, wherein the means for updating keys comprises means for performing a one way hash function on the keys associated with the affected intermediate nodes.

47. An apparatus as recited in claim 41, wherein the means for receiving a request comprises means for receiving the request at a load balancer having a single virtual address that represents the plurality of group controllers.

48. An apparatus as recited in claim 47, further comprising means for load balancing network traffic that is directed from a plurality of the network nodes to the plurality of group controllers.

49. An apparatus as recited in claim 41, wherein the means for establishing a secure communication channel comprises means for exchanging a public key of the first group controller with all other group controllers in the plurality of group controllers based upon optimized broadcast Diffie-Hellman protocol.

50. An apparatus as recited in claim 45, wherein the means for establishing a secure communication channel comprises:

means for receiving a public key value that is broadcast by the joining node;

means for sending a collective public key value from the network nodes to the joining node;

means for computing a shared secret key; and means for creating and storing a group shared secret key by exchanging private key values.

51. A computer-readable storage medium comprising one or more sequences of executable instructions for managing addition and deletion of network nodes from and to a secure multicast or broadcast group of network nodes in a communications network, wherein each of the network nodes is associated with a first group controller comprising information that is replicated in a plurality of group controllers, and wherein the network nodes and the plurality of group controllers are logically organized in a binary tree that represents the network nodes and the plurality of group controllers, in which leaf nodes of the binary tree represent network nodes that are joining or leaving the secure multicast or broadcast group, intermediate nodes represent other network nodes, and root nodes represent the plurality of group controllers, and which instructions, when executed by one or more processors, cause the processors to carry out the steps of:

joining the first group controller in a local network in which the plurality of group controllers are coupled;

establishing a secure channel between the first group controller and the plurality of group controllers through secure key exchange;

receiving a request to add or delete a network node from a load balancer that controls distribution of requests to the plurality of group controllers;

generating a new group session key for each network node represented in each branch of the binary tree that is affected by adding or deleting the network node from the secure multicast or broadcast group; and distributing the group session key from the first group controller to the other group controllers of the plurality of group controllers over the secure channel.

52. A computer-readable storage medium as recited in claim 51, further comprising executable instructions to carry out the step of generating the group session key only when the first group controller is designated as a master group controller that is authorized to join network nodes and generate group session keys.

53. A computer-readable storage medium as recited in claim 52, further comprising executable instructions for carrying out the step of successively designating different group controllers of the plurality of group controllers as the master group controller in real time.

54. A computer-readable storage medium comprising one or more sequences of executable instructions for creating a secure multicast or broadcast group, and which instructions, when executed by one or more processors, cause the processors to carry out the steps of:
establishing a secure communication channel among a plurality of group controllers via a public key exchange protocol;
load balancing traffic emanating from a plurality of network nodes to the plurality of group controllers; and
distributing a group session key by one of the group controllers based upon a logical arrangement of the network nodes in a binary tree structure, the binary tree structure having a root node, intermediate nodes, and leaf nodes, wherein the plurality of network nodes correspond to leaf nodes of the binary tree structure and the plurality of group controllers correspond to the root node.

55. The computer-readable storage medium as recited in claim 54, wherein the step of distributing further comprises:
circulating a token among the plurality of group controllers to designate the one group controller as having permission to selectively generate the group session key and keys associated with the intermediate nodes and the leaf nodes; and
selectively generating the group session key based upon the circulating step.

56. The computer-readable storage medium as recited in claim 54, wherein the step of distributing further comprises:
detecting whether the secure multicast or broadcast group has a network node that is leaving the secure multicast or broadcast group;
determining which of the intermediate nodes are affected in response to the detecting step;
updating keys associated with the affected intermediate nodes;
generating a new group session key; and
sending the new group session key to the leaf nodes.

57. The computer-readable storage medium as recited in claim 56, wherein the step of updating comprises:
generating a new key of a parent node of the leaving node; and
encrypting the new key of the parent node with a key of a network node adjacent to the parent node.

58. The computer-readable storage medium as recited in claim 54, wherein the step of distributing further comprises:
receiving a request message from one of the plurality of network nodes to join the secure multicast or broadcast group;
determining which of the intermediate nodes are affected in response to the receiving step;
updating keys associated with the affected intermediate nodes;
generating a new group session key and a private key of the joining node; and
sending a message comprising the new group session key, the private key, and the updated keys of affected intermediate nodes to the joining node.

59. The computer-readable storage medium as recited in claim 58, wherein the step of updating comprises performing a one way hash function on the keys associated with the affected intermediate nodes.

60. The computer-readable storage medium as recited in claim 54, further comprising instructions for carrying out the step of addressing the plurality of group controllers using a single virtual address.

61. A computer system that can manage addition and deletion of network nodes from and to a secure multicast or broadcast group of network nodes in a communications network, wherein each of the network nodes is associated with a first group controller comprising information that is replicated in a plurality of group controllers, and wherein the network nodes and the plurality of group controllers are logically organized in a binary tree that represents the network nodes and the plurality of group controllers, in which leaf nodes of the binary tree represent network nodes that are joining or leaving the secure multicast or broadcast group, intermediate nodes represent other network nodes, and root nodes represent the plurality of group controllers, the computer system comprising:
a load balancer coupled to the plurality of group controllers for interfacing inbound service requests to a selected group controller of the plurality of group controllers;
a bus coupled to the load balancer for transferring data;
one or more processors coupled to the bus for selectively generating a group session key under control of program instructions;
a memory coupled to the one or more processors via the bus;
one or more sequences of program instructions stored in the memory which, when executed by the one or more processors cause the one or more processors to perform the steps of:
joining the first group controller in a local network in which the plurality of group controllers are coupled;
establishing a secure channel between the first group controller and the plurality of group controllers through secure key exchange;
receiving a request to add or delete a network node from the load balancer that controls distribution of requests to the plurality of group controllers;
generating a new group session key for each network node represented in each branch of the binary tree that is affected by adding or deleting the network node from the secure multicast or broadcast group; and
distributing the group session key from the first group controller to the other group controllers of the plurality of group controllers over the secure channel.

62. A computer system as recited in claim 61, further comprising instructions to perform the step of generating the group session key only when the first group controller is designated as a master group controller that is authorized to join network nodes and generate group session keys.

63. A computer system as recited in claim 62, further comprising instructions to perform the step of successively designating different group controllers of the plurality of group controllers as the master group controller in real time.

64. A computer system that can create a secure multicast or broadcast group, the computer system comprising:
a load balancer coupled to the plurality of group controllers for interfacing inbound service requests to a selected group controller of the plurality of group controllers;
a bus coupled to the load balancer for transferring data;
one or more processors coupled to the bus for selectively generating a group session key under control of program instructions;

a memory coupled to the one or more processors via the bus;

one or more sequences of program instructions stored in the memory which, when executed by the one or more processors cause the one or more processors to perform the steps of:

establishing a secure communication channel among a plurality of group controllers via a public key exchange protocol;

load balancing traffic emanating from a plurality of network nodes to the plurality of group controllers; and distributing a group session key by one of the group controllers based upon a logical arrangement of the network nodes in a binary tree structure, the binary tree structure having a root node, intermediate nodes, and leaf nodes, wherein the plurality of network nodes correspond to leaf nodes of the binary tree structure and the plurality of group controllers correspond to the root node.

65. The computer system as recited in claim 64, wherein the step of distributing further comprises:

circulating a token among the plurality of group controllers to designate the one group controller as having permission to selectively generate the group session key and keys associated with the intermediate nodes and the leaf nodes; and selectively generating the group session key based upon the circulating step.

66. The computer system as recited in claim 64, wherein the step of distributing further comprises:

detecting whether the secure multicast or broadcast group has a network node that is leaving the secure multicast or broadcast group;

determining which of the intermediate nodes are affected in response to the detecting step;

updating keys associated with the affected intermediate nodes;

generating a new group session key; and sending the new group session key to the leaf nodes.

67. The computer system as recited in claim 66, wherein the step of updating comprises:

generating a new key of a parent node of the leaving node; and encrypting the new key of the parent node with a key of a network node adjacent to the parent node.

68. The computer system as recited in claim 64, wherein the step of distributing further comprises:

receiving a request message from one of the plurality of network nodes to join the secure multicast or broadcast group;

determining which of the intermediate nodes are affected in response to the receiving step;

updating keys associated with the affected intermediate nodes;

generating a new group session key and a private key of the joining node; and sending a message comprising the new group session key, the private key, and the updated keys of affected intermediate nodes to the joining node.

69. The computer system as recited in claim 68, wherein the step of updating comprises performing a one way hash function on the keys associated with the affected intermediate nodes.

70. The computer system as recited in claim 64, further comprising instructions to perform the step of addressing the plurality of group controllers using a single virtual address.

71. An apparatus for managing addition and deletion of network nodes from and to a secure multicast or broadcast group of network nodes in a communications network, wherein each of the network nodes is associated with a first group controller comprising information that is replicated in a plurality of group controllers, and wherein the network nodes and the plurality of group controllers are logically organized in a binary tree that represents the network nodes and the plurality of group controllers, in which leaf nodes of the binary tree represent network nodes that are joining or leaving the secure multicast or broadcast group, intermediate nodes represent other network nodes, and root nodes represent the plurality of group controllers, the apparatus comprising:

means for joining the first group controller in a local network in which the plurality of group controllers are coupled;

means for establishing a secure channel between the first group controller and the plurality of group controllers through secure key exchange;

means for receiving a request to add or delete a network node from a load balancer that controls distribution of requests to the plurality of group controllers;

means for generating a new group session key for each network node represented in each branch of the binary tree that is affected by adding or deleting the network node from the secure multicast or broadcast group; and means for distributing the group session key from the first group controller to the other group controllers of the plurality of group controllers over the secure channel.

72. An apparatus as recited in claim 71, further comprising means for generating the group session key only when the first group controller is designated as a master group controller that is authorized to join network nodes and generate group session keys.

73. An apparatus as recited in claim 72, further comprising means for successively designating different group controllers of the plurality of group controllers as the master group controller in real time.

74. An apparatus for creating a secure multicast or broadcast group, the apparatus comprising:

means for establishing a secure communication channel among a plurality of group controllers via a public key exchange protocol;

means for load balancing traffic emanating from a plurality of network nodes to the plurality of group controllers; and means for distributing a group session key by one of the group controllers based upon a logical arrangement of the network nodes in a binary tree structure, the binary tree structure having a root node, intermediate nodes, and leaf nodes, wherein the plurality of network nodes correspond to leaf nodes of the binary tree structure and the plurality of group controllers correspond to the root node.

75. The apparatus as recited in claim 74, wherein the means for distributing further comprises:

means for circulating a token among the plurality of group controllers to designate the one group controller as having permission to selectively generate the group session key and keys associated with the intermediate nodes and the leaf nodes; and means for selectively generating the group session key based upon the circulating step.

76. The apparatus as recited in claim 74, wherein the means for distributing further comprises:

means for detecting whether the secure multicast or broadcast group has a network node that is leaving the secure multicast or broadcast group;

means for determining which of the intermediate nodes are affected in response to the detecting means;

means for updating keys associated with the affected intermediate nodes;

means for generating a new group session key; and means for sending the new group session key to the leaf nodes.

77. The apparatus as recited in claim 76, wherein the means for updating comprises:

means for generating a new key of a parent node of the leaving node; and means for encrypting the new key of the parent node with a key of a network node adjacent to the parent node.

78. The apparatus as recited in claim 74, wherein the means for distributing further comprises:

means for receiving a request message from one of the plurality of network nodes to join the secure multicast or broadcast group;

means for determining which of the intermediate nodes are affected in response to the receiving means;

means for updating keys associated with the affected intermediate nodes;

means for generating a new group session key and a private key of the joining node; and means for sending a message comprising the new group session key, the private key, and the updated keys of affected intermediate nodes to the joining node.

79. The apparatus as recited in claim 78, wherein the means for updating comprises means for performing a one way hash function on the keys associated with the affected intermediate nodes.

80. The apparatus as recited in claim 74, further comprising means for addressing the plurality of group controllers using a single virtual address.

* * * * *